US010663031B2

(12) United States Patent
Komyo et al.

(10) Patent No.: US 10,663,031 B2
(45) Date of Patent: May 26, 2020

(54) SEALING STRUCTURE WITH ANNULAR POCKET AND SEALING APPARATUS

(71) Applicant: NOK CORPORATION, Tokyo (JP)

(72) Inventors: Akihiro Komyo, Fukushima (JP); Yusuke Kamiya, Fukushima (JP); Shinya Omoto, Tottori (JP); Toru Nakashima, Tottori (JP); Shota Toma, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 211 days.

(21) Appl. No.: 15/995,308

(22) Filed: Jun. 1, 2018

(65) Prior Publication Data

US 2018/0274626 A1  Sep. 27, 2018

Related U.S. Application Data

(63) Continuation of application No. PCT/JP2016/085590, filed on Nov. 30, 2016.

(51) Int. Cl.
*F16F 15/126* (2006.01)
*F16J 15/3232* (2016.01)
(Continued)

(52) U.S. Cl.
CPC ............ *F16F 15/126* (2013.01); *F16C 33/72* (2013.01); *F16C 33/805* (2013.01); *F16J 15/3232* (2013.01); *F16F 2230/30* (2013.01)

(58) Field of Classification Search
CPC . F16F 2230/30; F16J 15/3232; F16J 15/3252; F16J 15/3256; F16J 15/3264; F16J 15/3456; F16C 33/805
See application file for complete search history.

(56) References Cited

U.S. PATENT DOCUMENTS 6,196,551 B1 *  3/2001  Zellers ................. F16J 15/3204
                                                      277/402
6,293,558 B1 *  9/2001  Crapart ................. F16J 15/006
                                                      277/551
(Continued)

FOREIGN PATENT DOCUMENTS

CN         103201532 A       7/2013
CN         104235329 A      12/2014
(Continued)

OTHER PUBLICATIONS

Decision to Grant received on Jun. 5, 2017 in a counterpart Japanese application 2017-523008 and English translation.
(Continued)

*Primary Examiner* — Nicholas L Foster
(74) *Attorney, Agent, or Firm* — Pearne & Gordon LLP

(57) ABSTRACT

To provide a sealing structure with an annular pocket and a sealing apparatus that can efficiently reduce exposure of a seal lip of the sealing apparatus to foreign matter entering from the outside. In a sealing structure (1) with a torsional damper and an oil seal, a hub pocket (30) has an outer circumferential surface (31) in an annular shape centered about an axis x that extends along the axis x and is formed in an outer shell part (33) that is opposed to a shaft member on an outer periphery side, a dust discharging hole (36s) or a dust discharging groove (36sa) connected to the hub pocket (30) is formed in the outer shell part (33), and the dust discharging hole (36s) or the dust discharging groove (36sa) is inclined at a predetermined angle in such a manner that a discharge opening (36sout) is directed in an opposite direction to a rotational direction of the shaft member.

8 Claims, 21 Drawing Sheets

(51) Int. Cl.
*F16C 33/80* (2006.01)
*F16C 33/72* (2006.01)

(56) References Cited

U.S. PATENT DOCUMENTS

| | | | | |
|---|---|---|---|---|
| 9,796,212 | B2* | 10/2017 | Nakamura | B60B 27/0005 |
| 9,815,328 | B2* | 11/2017 | Kaneko | B60B 27/0005 |
| 9,927,031 | B2* | 3/2018 | Omoto | F16F 15/126 |
| 10,041,562 | B2* | 8/2018 | Kamiya | F16J 15/32 |
| 10,352,451 | B2* | 7/2019 | Kamiya | F16C 33/805 |
| 10,571,026 | B2* | 2/2020 | Komyo | F16F 15/126 |
| 2008/0031556 | A1* | 2/2008 | Heim | B60B 27/00 384/448 |
| 2012/0281939 | A1* | 11/2012 | Nakamura | B60B 27/0005 384/477 |
| 2013/0279834 | A1 | 10/2013 | Willaczek et al. | |
| 2014/0203514 | A1 | 7/2014 | Colineau et al. | |
| 2015/0078691 | A1* | 3/2015 | Nakamura | B60B 27/0005 384/448 |
| 2015/0147013 | A1* | 5/2015 | Kaneko | B60B 27/0005 384/448 |
| 2015/0337961 | A1 | 11/2015 | Miletto et al. | |
| 2017/0234398 | A1* | 8/2017 | Kamiya | F16J 15/32 277/562 |
| 2017/0268676 | A1* | 9/2017 | Kamiya | F16J 15/447 |
| 2017/0284547 | A1* | 10/2017 | Komyo | F16J 15/3232 |
| 2019/0113080 | A1* | 4/2019 | Kamiya | F16C 33/805 |

FOREIGN PATENT DOCUMENTS

| | | |
|---|---|---|
| EP | 2 949 972 A1 | 12/2015 |
| JP | 5-25049 U | 4/1993 |
| JP | 2002-295588 A | 9/2002 |
| JP | 2011-241891 A | 1/2011 |
| JP | 2015-148331 A | 8/2015 |

OTHER PUBLICATIONS

English translation of Written Opinion for corresponding International Application No. PCT/JP2016/085590 dated Feb. 28, 2017.
English translation of International Preliminary Report on Patentability for corresponding International Application No. PCT/JP2016/085590 dated Jun. 5, 2018.
Extended European Search Report dated Jun. 26, 2019 for corresponding European Application No. 16870724.8.
Chinese Office Action dated Nov. 22, 2018 for corresponding Chinese Application No. 201680071097.2.
International Search Report for corresponding International Application No. PCT/JP2016/085590 dated Feb. 28, 2017.
Written Opinion for corresponding International Application No. PCT/JP2016/085590 dated Feb. 28, 2017.

* cited by examiner though the damper pulley 100

SEALING STRUCTURE WITH ANNULAR POCKET AND SEALING APPARATUS

The present application is a continuation application of International Application No. PCT/JP2016/085590, filed on Nov. 30, 2016, which claims priority to Japanese Patent Application No. 2015-237231, filed on Dec. 4, 2015, and Japanese Patent Application No. 2016-109943, filed on Jun. 1, 2016. The contents of these applications are incorporated herein by reference in their entirety.

TECHNICAL FIELD

The present disclosure relates to a sealing structure with an annular pocket and a sealing apparatus and, for example, relates to a labyrinth structure comprising a torsional damper to absorb a torsional vibration generated from a rotary shaft of an engine of a vehicle or the like, and an oil seal for the torsional damper.

BACKGROUND ART

In an engine of a vehicle, for example, a torsional damper is attached to one end of a crankshaft to reduce a torsional vibration caused by a rotational fluctuation of the crankshaft. The torsional damper used in the engine of the vehicle is typically in the form of a damper pulley and transmits part of the power of the engine to auxiliary machinery, such as a water pump, a compressor of an air conditioner or the like, through a power transmission belt. The gap between the torsional damper and, for example, a through-hole of a front cover into which the crankshaft is inserted is sealed by an oil seal.

FIG. 21 is a partial cross-sectional view taken along an axis, schematically showing a conventional arrangement of a damper pulley and an oil seal of an engine of a vehicle. As shown in FIG. 21, a conventional damper pulley 100 includes a hub 101, a pulley 102, and a damper elastic body 103 disposed between the hub 101 and the pulley 102. The hub 101 includes a boss part 101*a* on the inner periphery side, a rim part 101*b* on the outer periphery side, and a disk part 101*c* connecting the boss part 101*a* and the rim part 101*b* to each other. The damper pulley 100 is fixed to a crankshaft 120 by a bolt 121 with the boss part 101*a* of the hub 101 fitted into one end part of the crankshaft 120.

In addition, to reduce the weight, some conventional damper pulleys 100 have a plurality of windows 101*d* as through-holes passing through the disk part 101*c* of the hub 101, circumferentially formed (for example, see Japanese Utility Model Application Publication No. 05-25049 and Japanese Patent Application Publication No. 2011-241891).

DISCLOSURE

However, the conventional damper pulley 100 with the windows 101*d* is susceptible to entry of foreign matter such as muddy water, sand or dust to the side of the engine through the windows 101*d*, although the damper pulley 100 has a reduced weight in the engine. If foreign matter enters the side of the engine, the foreign matter can enter between the oil seal 110 and the boss part 101*a*, the seal lip 111 can be damaged or deteriorate due to the seal lip 111 catching the foreign matter, and the sealing performance of the oil seal 110 can deteriorate, leading to oil leakage.

Thus, when the conventional damper pulley 100 with the windows 101*d* is used, there is a need for preventing exposure of the seal lip 111 of the oil seal 110 not only to foreign matter entering from around the outer periphery of the damper pulley 100 but also to foreign matter entering through the windows 101*d*.

The present disclosure has been devised in view of the problems described above, and it is an object of the present disclosure to provide a sealing structure with an annular pocket and a sealing apparatus that can efficiently reduce exposure of a seal lip of an oil seal to foreign matter entering from around the torsional damper.

Solution to Problem

To attain the object described above, the present disclosure provides a sealing structure with an annular pocket and a sealing apparatus, wherein the pocket has an outer circumferential surface extending along an axis and forms an annular shape around the axis, forms a recess in an annular shape centered about the axis that is recessed toward one side in a direction of the axis, and is formed in a shaft member that is capable of rotating about the axis and penetrates through a through-hole in an attachment target to which the sealing apparatus is to be attached or in a functional member attached to the shaft member, the sealing apparatus includes a seal lip in an annular shape centered about the axis and a side lip in an annular shape centered about the axis that extends toward the one side in the direction of the axis, and is attached in the through-hole in the attachment target to form a seal between the shaft member or the functional member and the through-hole, in the sealing apparatus attached to the attachment target, the seal lip is in direct or indirect contact with the shaft member or the functional member in a slidable manner, and the side lip extends toward the pocket and forms an annular gap between the side lip and the outer circumferential surface of the pocket, the pocket is formed in an outer shell part that is opposed to the shaft member or the functional member on an outer periphery side, a dust discharging hole or a dust discharging groove connected to the pocket is formed in the outer shell part, and the dust discharging hole or the dust discharging groove is inclined at a predetermined angle in such a manner that a discharge opening is directed in an opposite direction to a rotational direction of the shaft member or the functional member.

In the sealing structure with an annular pocket and a sealing apparatus according to an aspect of the present disclosure, the dust discharging hole is formed at a location in the vicinity of a bottom surface of the pocket, which is an outer side surface forming the recess.

In the sealing structure with an annular pocket and a sealing apparatus according to an aspect of the present disclosure, the side lip forms the annular gap between the side lip and an end part of the outer circumferential surface of the pocket on the oil seal side.

In the sealing structure with an annular pocket and a sealing apparatus according to an aspect of the present disclosure, the side lip is opposed to the outer circumferential surface of the pocket and forms the annular gap between the side lip and the outer circumferential surface of the pocket.

In the sealing structure with an annular pocket and a sealing apparatus according to an aspect of the present disclosure, an outer periphery side surface of the pocket, which is a surface of the outer shell part on the outer periphery side, decreases in diameter toward the disk part in the direction of the axis.

In the sealing structure with an annular pocket and a sealing apparatus according to an aspect of the present disclosure, the outer circumferential surface of the pocket increases in diameter toward the one side in the direction of the axis and has at least one foreign matter discharging groove, which is a groove that is recessed in the direction of the outer periphery side and extends from the one side to another side in the direction of the axis.

In the sealing structure with an annular pocket and a sealing apparatus according to an aspect of the present disclosure, the foreign matter discharging groove has a bottom part, which is a part on the outer periphery side, extending along the axis in a radial direction.

In the sealing structure with an annular pocket and a sealing apparatus according to an aspect of the present disclosure, the foreign matter discharging groove extends in the radial direction in such a manner that the bottom part deviates from the axis as the foreign matter discharging groove extends from the one side toward the other side in the direction of the axis.

The sealing structure with an annular pocket and a sealing apparatus according to the present disclosure can efficiently reduce exposure of a seal lip of an oil seal to foreign matter entering from around a torsional damper.

DETAILED DESCRIPTION

Hereinafter, embodiments of the present disclosure will be described with reference to the drawings.

First Embodiment

Figure 1:
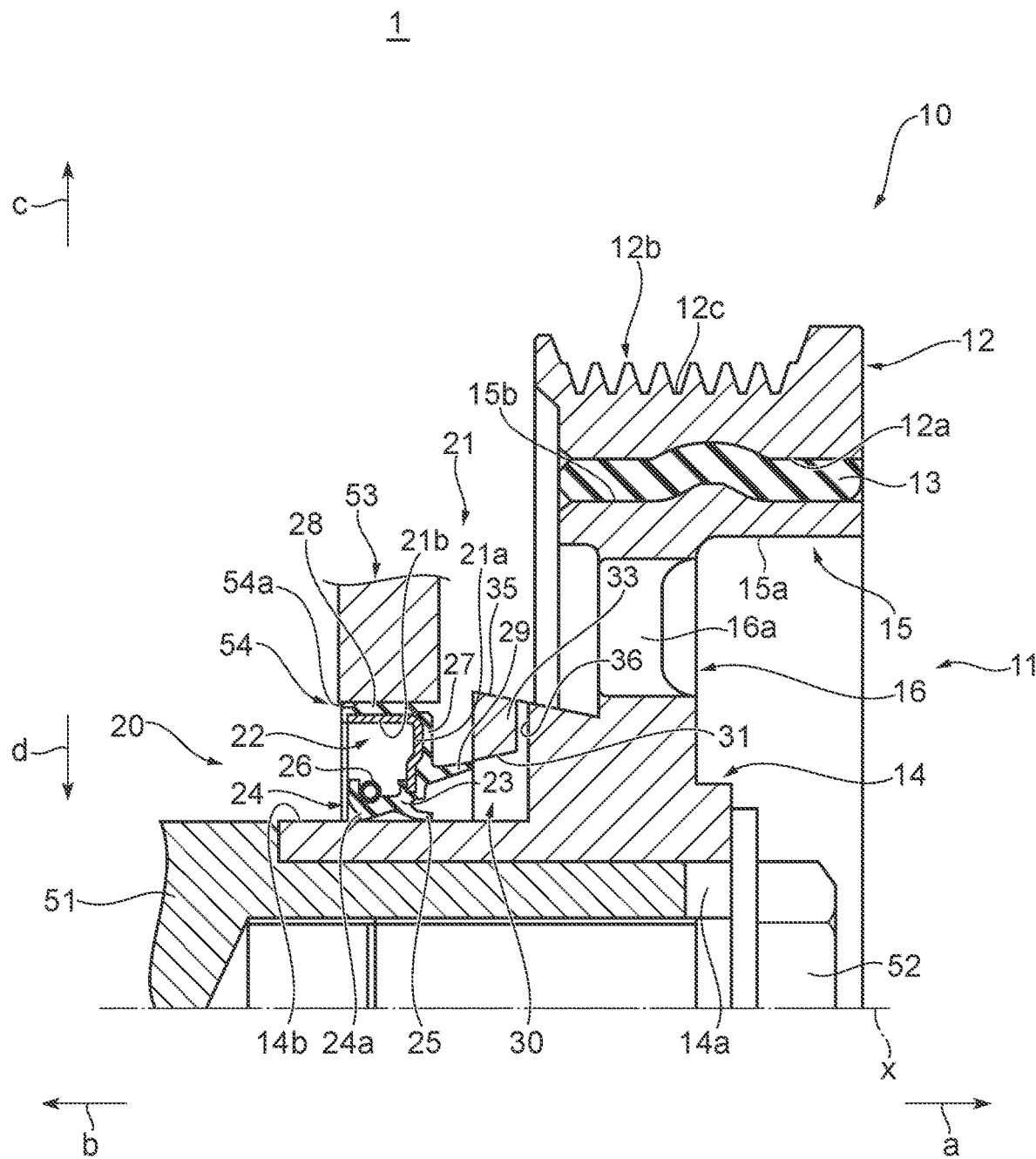
FIG. 1 is a partial cross-sectional view taken along an axis, showing a schematic configuration of a sealing structure with a torsional damper and an oil seal according to a first embodiment of the present disclosure.

FIG. 1 is a partial cross-sectional view taken along an axis, showing a schematic configuration of a sealing structure with a torsional damper and an oil seal according to a first embodiment of the present disclosure. The sealing structure with a torsional damper and an oil seal according to the first embodiment of the present disclosure is used for an engine of an automobile. In the following, for convenience of explanation, an arrow a (see FIG. 1) direction in a direction of an axis x will be referred to as an outer side, and an arrow b (see FIG. 1) direction in the direction of the axis x will be referred to as an inner side. More specifically, the outer side is the direction away from the engine, and the inner side is the direction toward the engine and is the engine side. In a direction perpendicular to the axis x (which will also be referred to as "a radial direction"), the direction away from the axis x (indicated by an arrow c in FIG. 1) will be referred to as an outer periphery side, and the direction toward the axis x (indicated by an arrow "d" in FIG. 1) will be referred to as an inner periphery side.

As shown in FIG. 1, a sealing structure 1 with a torsional damper and an oil seal according to the first embodiment of the present disclosure includes a damper pulley 10 as the torsional damper and an oil seal 20. The damper pulley 10 is fixed to one end of a crankshaft 51 of the engine by a bolt 52, and the oil seal 20 forms a seal between a through-hole 54 of a front cover 53 of the engine and the damper pulley 10.

The damper pulley 10 includes a hub 11, a pulley 12 as a mass body, and a damper elastic body 13 disposed between the hub 11 and the pulley 12. The hub 11 is an annular member centered about the axis x and includes a boss part 14 on the inner periphery side, a rim part 15 on the outer periphery side, and a disk part 16 having a substantially circular disk-like shape that connects the boss part 14 and the rim part 15 to each other. The hub 11 is molded or otherwise formed from a metal material, for example.

In the hub 11, the boss part 14 is an annular part that has a through-hole 14a and is centered about the axis x, and the disk part 16 extends in the outer periphery direction from an outer circumferential surface of an outer side part of the boss part 14. The boss part 14 has an outer circumferential surface 14b, which is a cylindrical outer periphery side surface of an inner side part thereof, and the outer circumferential surface 14b is a smooth surface and serves as a sealing surface for the oil seal 20 as described later. The rim part 15 is an annular, or more specifically, cylindrical part centered about the axis x, and the rim part 15 is a part located further on the outer periphery side than the boss part 14, concentrically with the boss part 14. The disk part 16 extends in the inner periphery direction from an inner circumferential surface 15a, which is a surface of the rim part 15 on the inner periphery side. The damper elastic body 13 is in pressure-contact with an outer circumferential surface 15b, which is a surface of the rim part 15 on the outer periphery side.

Figure 2:
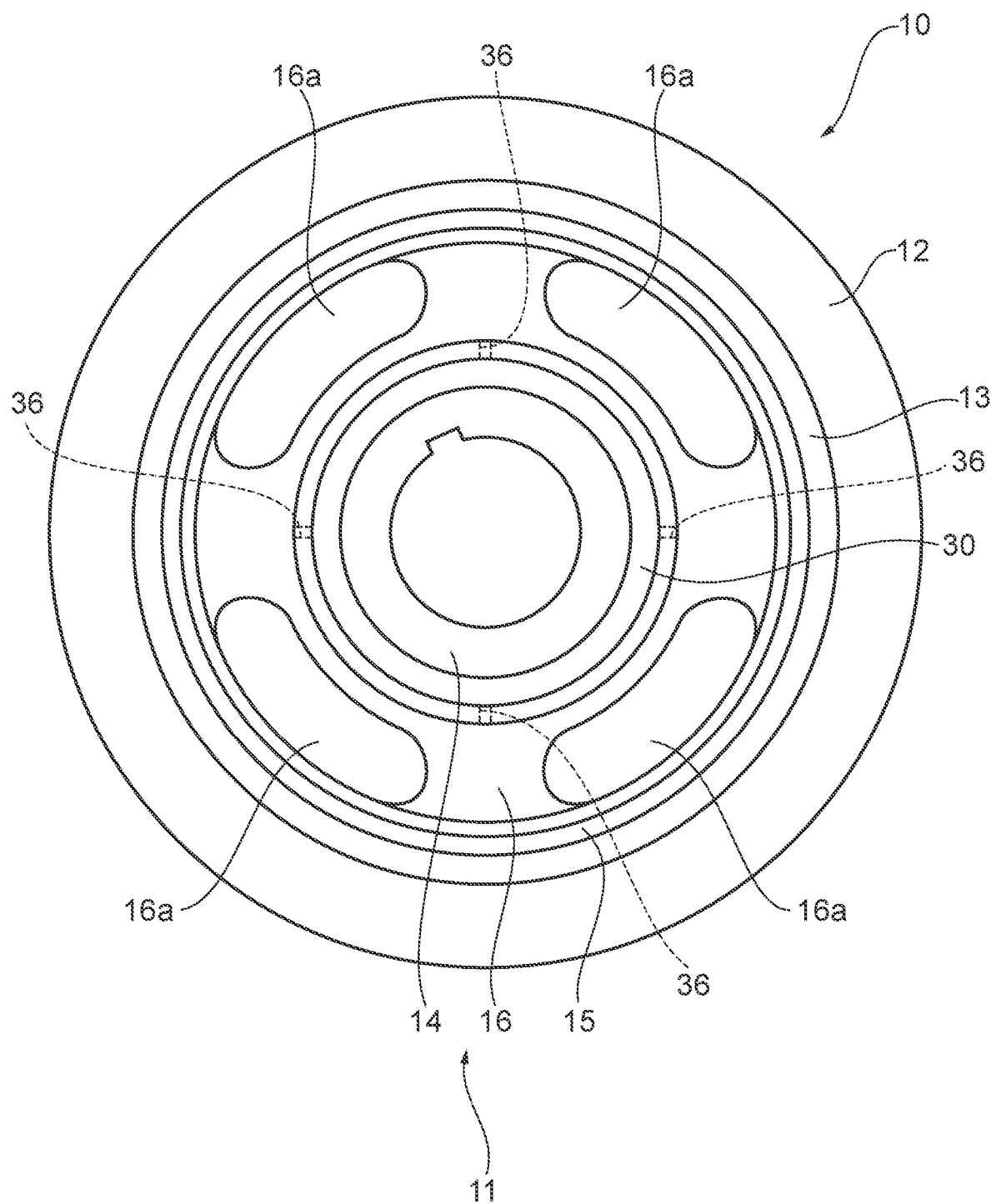
FIG. 2 is a rear view showing a schematic configuration of the torsional damper of the sealing structure shown in FIG. 1.

The disk part 16 extends between the boss part 14 and the rim part 15 and connects the boss part 14 and the rim part 15 to each other. The disk part 16 may extend in a direction perpendicular to the axis x or in a direction oblique to the axis x. The cross section of the disk part 16 taken along the axis x (also referred to as simply a "cross section") may be curved or straight. As shown in FIGS. 1 and 2, the disk part 16 has at least one window 16a, which is a through-hole penetrating the disk part 16 between the inner side and the outer side. According to this embodiment, four windows 16a are formed concentrically about the axis x and at regular angular intervals (see FIG. 2). The windows 16a are intended to reduce the weight of the hub 11 and thus the damper pulley 10.

The pulley 12 is an annular member centered about the axis x and is shaped to cover the hub 11 on the outer periphery side. More specifically, an inner circumferential surface 12a, which is a surface of the pulley 12 on the inner periphery side, has a shape that conforms with the shape of the outer circumferential surface 15b of the rim part 15 of the hub 11, and as shown in FIG. 1, the pulley 12 is positioned in such a manner that the inner circumferential surface 12a is radially opposed at a distance to the outer circumferential surface 15b of the rim part 15. In the outer circumferential surface 12b, which is a surface of the pulley 12 on the outer periphery side, a plurality of annular V-shaped grooves 12c are formed so that a timing belt (not shown) can be wound around the pulley 12.

The damper elastic body 13 is disposed between the pulley 12 and the rim part 15 of the hub 11. The damper elastic body 13 is a damper rubber member and is molded by cross-linking (vulcanization) of a rubber-like elastic material having high heat resistance, high cold resistance and high fatigue strength. The damper elastic body 13 is press-fitted between the pulley 12 and the rim part 15 of the hub 11, and fitted and fastened between the inner circumferential surface 12a of the pulley 12 and the outer circumferential surface 15b of the rim part 15.

In the damper pulley 10, the pulley 12 and the damper elastic body 13 form a damper section, and the natural frequency in the torsional direction of the damper section is tuned to agree with the natural frequency in the torsional direction of the crankshaft 51, which lies within a predetermined frequency range in which the torsional angle of the crankshaft 51 is at the maximum. That is, the inertial mass of the pulley 12 in the circumferential direction and the shear spring constant of the damper elastic body 13 in the torsional direction are adjusted so that the natural frequency in the torsional direction of the damper section agrees with the natural frequency in the torsional direction of the crankshaft 51.

The damper pulley 10 further has an annular hub pocket 30 centered about the axis x that is recessed in the direction toward the disk part 16 (the outer side direction) and circumferentially extends along the boss part 14 of the hub 11. The hub pocket 30 will be described in detail later with reference to FIG. 3.

As described above, the damper pulley 10 is attached to one end of the crankshaft 51. More specifically, as shown in FIG. 1, the damper pulley 10 is fixed to the crankshaft 51 by inserting one end of the crankshaft 51 into the through-hole 14a of the boss part 14 of the hub 11 and screwing the bolt 52 into the crankshaft 51 from the outer side. A key to be engaged with the crankshaft 51 and the boss part 14, such as a Woodruff key, is provided between the crankshaft 51 and the boss part 14 to prevent the damper pulley 10 from rotating relative to the crankshaft 51.

When attached to the crankshaft 51, the damper pulley 10 is in a state where the inner part of the boss part 14 having the outer circumferential surface 14b is inserted in the through-hole 54 of the front cover 53, and there is an annular gap between the outer circumferential surface 14b of the boss part 14 and the through-hole 54 of the front cover 53.

As shown in FIG. 1, the oil seal 20 includes a reinforcing ring 21 that is made of a metal and has an annular shape centered about the axis x and an elastic body part 22 that is made of an elastic material and has an annular shape centered about the axis x. The elastic body part 22 is integrally attached to the reinforcing ring 21. The metal forming the reinforcing ring 21 may be stainless steel or SPCC (cold rolled steel sheet), for example. The elastic material forming the elastic body part 22 may be various rubber materials, for example. The various rubber materials include synthetic rubbers, such as nitrile rubber (NBR), hydrogenated nitrile rubber (H-NBR), acrylic rubber (ACM) or fluororubber (FKM).

The reinforcing ring 21 has a substantially L-shaped cross section and has a disk part 21a and a cylindrical part 21b. The disk part 21a is a hollow disk-shaped part that extends in a direction perpendicular to the axis x, and the cylindrical part 21b is a cylindrical part that extends inwardly in the direction of the axis x from an outer periphery side end of the disk part 21a.

The elastic body part 22 is attached to the reinforcing ring 21. In this embodiment, the elastic body part 22 is formed integrally with the reinforcing ring 21 to cover the reinforcing ring 21 from the outer side and the outer periphery side. The elastic body part 22 includes a lip waist part 23, a seal lip 24, and a dust lip 25. As shown in FIG. 1, the lip waist part 23 is a part located in the vicinity of an inner periphery side end of the disk part 21a of the reinforcing ring 21, and the seal lip 24 is a part that extends toward the inner side from the lip waist part 23 and is placed to be opposed to the cylindrical part 21b of the reinforcing ring 21. The dust lip 25 extends from the lip waist part 23 in the direction of the axis x.

The seal lip 24 has, at the inner side end, an annular lip tip end part 24a having a cross section whose shape is a wedge shape protruding in the inner periphery side direction. The lip tip end part 24a is shaped to come into intimate contact with the outer circumferential surface 14b of the boss part 14 of the hub 11 in such a manner that the outer circumferential surface 14b is slidable, and to form a seal between the lip tip end part 24a and the damper pulley 10, as described later. On the outer peripheral part side of the seal lip 24, a garter spring 26 is fitted, and the garter spring 26 radially inwardly biases the seal lip 24.

The dust lip 25 is a part that extends from the lip waist part 23 toward the outer side and the inner periphery side. The dust lip 25 prevents entry of foreign matter toward the lip tip end part 24a during use.

The elastic body part 22 includes a rear cover 27 and a gasket part 28. The rear cover 27 covers the disk part 21a of the reinforcing ring 21 from the outer side, and the gasket part 28 covers the cylindrical part 21b of the reinforcing ring 21 from the outer periphery side.

The oil seal 20 includes a side lip 29 that extends in the outer side direction. The side lip 29 will be described in detail later with reference to FIG. 3.

The reinforcing ring 21 is manufactured by press working or forging for example, and the elastic body part 22 is molded with a mold by cross-linking (vulcanization). In the cross-linking, the reinforcing ring 21 is placed inside the mold, and the elastic body part 22 is bonded to the reinforcing ring 21 by cross-linking (vulcanization) bonding, and then the elastic body part 22 is integrally molded with the reinforcing ring 21.

As described above, the oil seal 20 seals the gap formed between the through-hole 54 of the front cover 53 and the outer circumferential surface 14b of the boss part 14 of the damper pulley 10. More specifically, the oil seal 20 is press-fitted into the through-hole 54 of the front cover 53, and the gasket part 28 of the elastic body part 22 is compressed and abuts in a fluid tight manner against an inner circumferential surface 54a, which is the inner periphery side surface of the through-hole 54. Thus, a seal is formed between the oil seal 20 and the through-hole 54 of the front cover 53. On the other hand, the lip tip end part 24a of the seal lip 24 abuts in a fluid tight manner against the outer circumferential surface 14b of the boss part 14 of the hub 11, and thus, a seal is formed between the oil seal 20 and the damper pulley 10.

Figure 3:
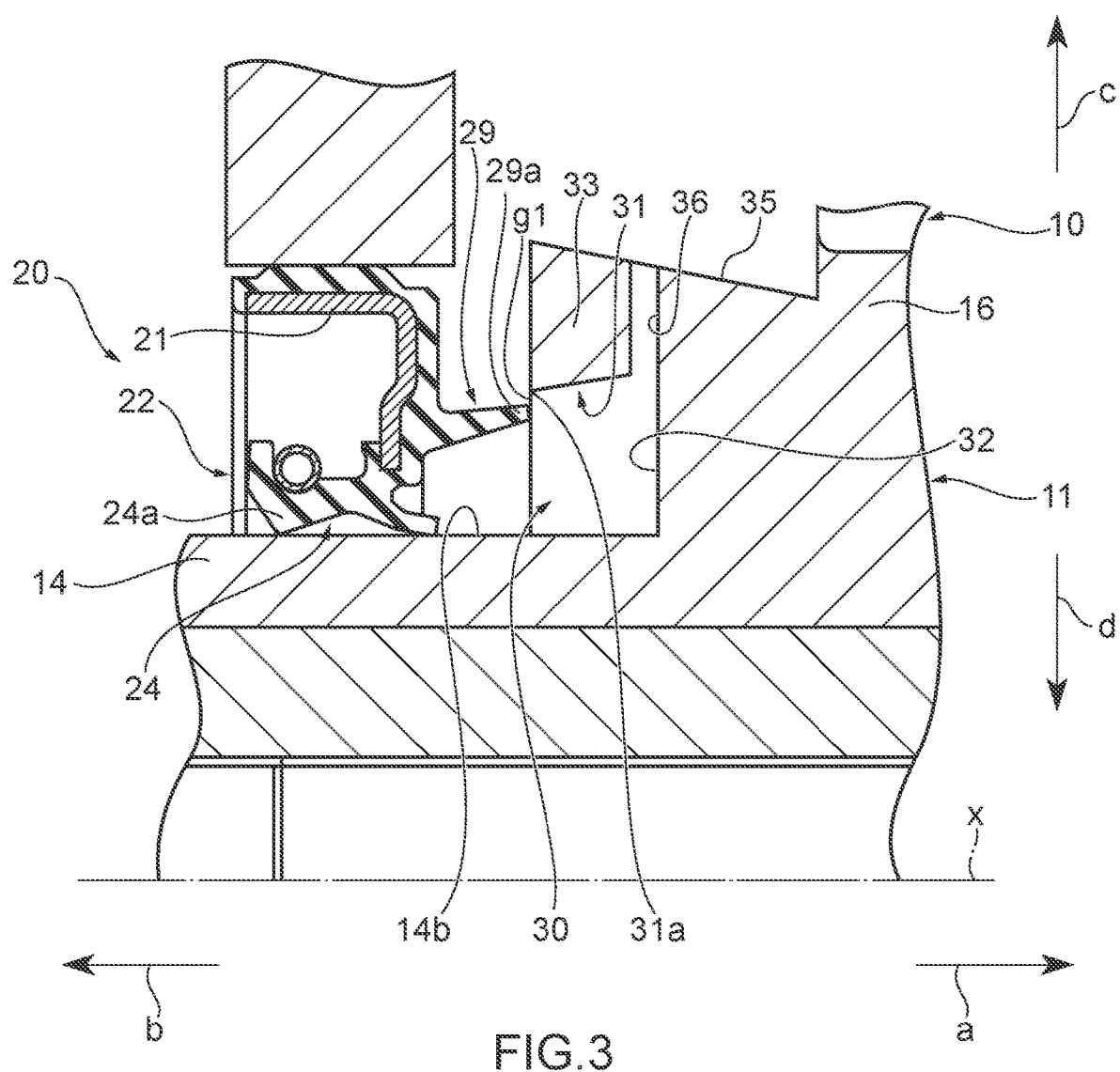
FIG. 3 is a partial enlarged cross-sectional view of the sealing structure with a torsional damper and an oil seal shown in FIG. 1.

Next, the hub pocket 30 of the damper pulley 10 and the side lip 29 of the oil seal 20 will be described with reference to FIG. 3. FIG. 3 is a partial enlarged view of the sealing structure 1 with a torsional damper and an oil seal.

As shown in FIG. 3, the hub pocket 30 is formed in the damper pulley 10 by an outer shell part thereof located on the inner side of the disk part 16. The outer shell part is formed in the hub 11. The hub pocket 30 is an annular recess that is recessed toward the disk part 16 and extends to surround the outer circumferential surface 14b of the boss part 14. More specifically, the hub pocket 30 includes an annular outer circumferential surface 31 that is formed by a projection 33 serving as the outer shell part and is formed on the projection 33 that is opposed to the outer circumferential surface 14b of the boss part 14, and a bottom surface 32 that extends between the outer circumferential surface 31 and the outer circumferential surface 14b of the boss part 14. The hub pocket 30 is defined by the outer circumferential surface 31, the bottom surface 32 and the outer circumferential surface 14b of the boss part 14.

The outer circumferential surface 31 of the hub pocket 30 increases in the diameter toward a disk part 16 direction in the direction of the axis x (the outer side direction) and is an annular surface expanding toward the outer periphery side, toward the disk part 16 direction in the direction of the axis x (the outer side direction). For example, the outer circumferential surface 31 is a tapered surface in a substantially conical surface shape.

The hub pocket 30 may be formed by an annular projection 33 that extends in the inner side direction from the disk part 16 of the hub 11 or by forming a recess that is recessed in the outer side direction in the disk part 16 serving as the outer shell part. In the case where the hub pocket 30 is formed by the annular projection 33 that extends in the inner side direction from the disk part 16, an inner circumferential surface of the projection 33 constitutes the outer circumferential surface 31 of the hub pocket 30, as shown in FIG. 3. In the case where the hub pocket 30 is formed by forming a recess that is recessed in the outer side direction in the disk part 16, an outer circumferential surface of the recess constitutes the outer circumferential surface 31 of the hub pocket 30. In this embodiment, as shown in FIG. 3, the annular projection 33 that protrudes in the inner side direction in the direction of the axis x from the disk part 16 of the hub 11 is formed, and the projection 33 provides the outer circumferential surface 31 and thus the hub pocket 30 is formed. Alternatively, the hub pocket 30 may be formed by the projection 33 and the recess formed in the disk part 16.

The bottom surface 32 of the hub pocket 30 may be formed by an inner side surface of the disk part 16 of the hub 11, may be formed on the inner side than the inner side surface of the disk part 16 of the hub 11, or may be formed by forming a recess in the inner side surface of the disk part 16 of the hub 11.

In the projection 33 forming the hub pocket 30, a dust discharging hole 36 that penetrates the projection 33 from the outer circumferential surface 31 is formed. More specifically, the dust discharging hole 36 is a through-hole that penetrates the projection 33, extends in the radial direction from the outer circumferential surface 31, and connects the hub pocket 30 and a space on the outer periphery side of the projection 33. For example, as shown in FIG. 3, the dust discharging hole 36 is formed at a location in the vicinity of the bottom surface 32. One or more dust discharging holes 36 can be formed. In the case where a plurality of dust discharging holes 36 are provided, it is desirable that the dust discharging holes 36 are distributed at regular intervals to prevent foreign matter from being deposited nonuniformly in the circumferential direction. In the present embodiment, as shown in FIG. 2, four dust discharging holes 36 are provided at regular angular intervals in the circumferential direction. The expression "the dust discharging hole 36 is formed at a location in the vicinity of the bottom surface 32" is not limited to the case where the outer side edge of the dust discharging hole 36 is flush with the bottom surface 32 as shown in FIG. 3 but includes cases where the dust discharging hole 36 is provided closer to the bottom surface 32 than a midpoint of the outer circumferential surface 31 in the direction of the axis x, and it is preferred that the position of the dust discharging hole 36 is as close to the bottom surface 32 as possible. In the case where the hub pocket 30 is formed in the disk part 16 serving as the outer shell part rather than in the projection 33, the dust discharging hole 36 is formed in the disk part 16.

An outer periphery side surface 35 of the projection 33, which is a surface on the outer periphery side, is formed in such a manner that the diameter decreases toward the disk part 16 along the axis x and is inclined in the inner periphery side direction toward the outer side. Since the outer periphery side surface 35 of the projection 33 is formed in such a manner that the diameter decreases toward the disk part 16 along the axis x, foreign matter can be deposited on the outer periphery side surface 35. As a result, entry of foreign matter to the seal lip 24 side can be reduced. The outer periphery side surface 35 of the projection 33 may not be inclined as described above and may have the shape of a cylindrical surface centered about the axis x.

As shown in FIG. 3, the side lip 29 of the oil seal 20 extends in the outer side direction. More specifically, the side lip 29 extends in parallel with the axis x or in a direction oblique to the axis x in the outer side direction and the outer periphery side direction. An outer end 29a, which is an outer side end of the side lip 29, is located more towards the radial direction on the inner side (the side of the engine) than an inner end 31a, which is an inner side end of the outer circumferential surface 31 of the hub pocket 30, and does not enter the inside of the hub pocket 30 in the direction of the axis x (the outer side direction). An annular gap g1 is formed between the outer end 29a of the side lip 29 and the inner end 31a of the outer circumferential surface 31 of the hub pocket 30.

The annular gap g1 formed between the outer end 29a of the side lip 29 and the inner end 31a of the outer circumferential surface 31 of the hub pocket 30 provides a labyrinth seal. Therefore, even if foreign matter, such as muddy water, sand, or dust enters from the outside not only through a gap between the front cover 53 and the damper pulley 10 but also through the windows 16a of the disk part 16 of the hub 11, the labyrinth seal (the gap g1) formed by the side lip 29 and the hub pocket 30 reduces entry of the foreign matter further toward the seal lip 24 side. In this way, exposure of the seal lip 24 of the oil seal 20 to foreign matter entering from around the damper pulley 10 can be reduced. Thus, damage to or deterioration of the lip tip end part 24a due to the lip tip end part 24a catching foreign matter can be reduced, and thus deterioration of the sealing performance of the oil seal 20 that leads to oil leakage can be reduced. The foreign matter that enters from around the damper pulley 10 includes foreign matter that enters from the outside through any gap between the damper pulley 10 and the front cover 53 and foreign matter that enters from the outside through the windows 16a of the disk part 16 of the hub 11.

Since the outer circumferential surface 31 of the hub pocket 30 that forms the labyrinth seal (the gap g1) has the diameter-increasing shape r toward the outer side as described above, at the labyrinth seal, entry of foreign matter further toward the seal lip 24 side can be more effectively reduced.

Specifically, since the damper pulley 10 rotates about the axis x, the foreign matter such as dust contained in the hub pocket 30 is subject to a centrifugal force and collected on the outer circumferential surface 31 of the hub pocket 30. Since the outer circumferential surface 31 of the hub pocket 30 is shaped in such a manner that the diameter increases toward the outer side, and the recess of the hub pocket 30 is formed to expand to the outer periphery side as it comes closer to the bottom surface 32 of the hub pocket 30, the foreign matter having entered the hub pocket 30 is less likely to exit from the hub pocket 30 and is deposited on the outer circumferential surface 31. Since the foreign matter is deposited on the outer circumferential surface 31, the amount of the foreign matter that enters the seal lip 24 side can be reduced, and entry of the foreign matter to the seal lip 24 side can be more effectively reduced at the labyrinth seal.

On the other hand, if the amount of the foreign matter deposited on the outer circumferential surface 31 becomes large, for example, if the amount of the foreign matter deposited becomes large to such an extent that the foreign matter deposited goes beyond the inner end 31a of the outer circumferential surface 31 of the hub pocket 30, the amount of the foreign matter entering the seal lip 24 side can increase, and this is not preferable. To avoid this, in the present embodiment, the dust discharging hole 36 that penetrates the projection 33 from the outer circumferential surface 31 is formed in the projection 33, which forms the hub pocket 30, to prevent the foreign matter from being excessively deposited on the outer circumferential surface 31 as described later.

The dust discharging hole 36 will be described with reference to FIGS. 4 to 9. While FIGS. 1 to 3 are partial cross-sectional views showing the upper half of the cross section taken along the axis x for illustrating a schematic configuration of the sealing structure with a torsional damper and an oil seal, FIGS. 4 to 6 and 8 are partial cross-sectional views showing the lower half of the cross section taken along the axis x. In FIGS. 4 to 9, various dust discharging holes are shown as modification examples of the dust discharging hole according to the present disclosure.

Figure 4:
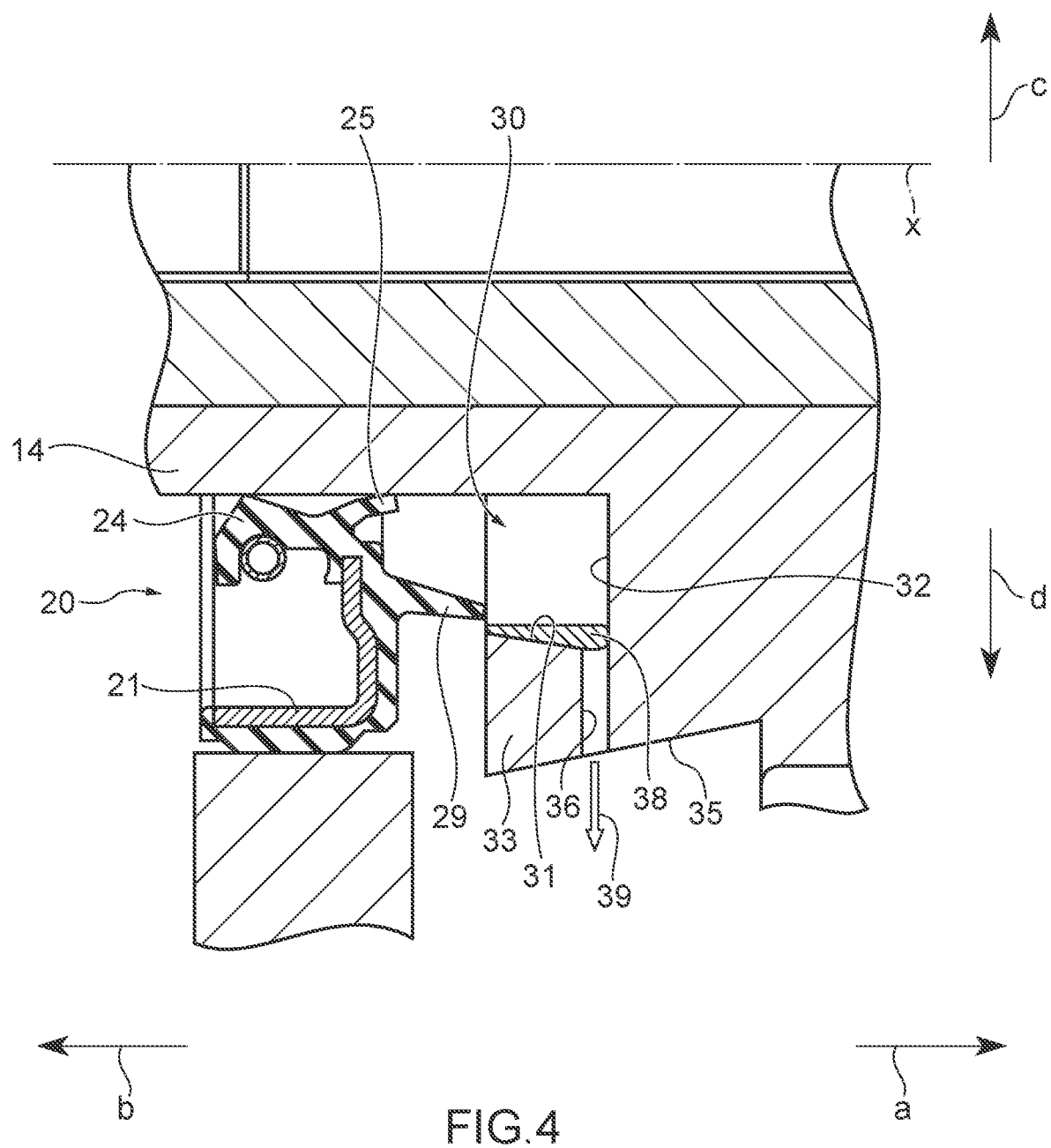
FIG. 4 is a partial enlarged cross-sectional view taken along the axis, for illustrating an operation of the sealing structure with a torsional damper and an oil seal according to the first embodiment of the present disclosure.

FIG. 4 is a diagram for illustrating an operation of the sealing structure 1 with a torsional damper and an oil seal according to the first embodiment shown in FIGS. 1 to 3. In FIG. 4, a dust discharging hole 36 located at a lower position in the direction of gravity is shown. In FIG. 4, an arrow 39 indicates that the foreign matter deposited in the hub pocket 30 is discharged through the dust discharging hole 36. As shown in FIG. 4, the dust discharging hole 36 located at a lower position in the direction of gravity more significantly serves to discharge the foreign matter deposited in the hub pocket 30 than the dust discharging hole 36 located at an upper position in the direction of gravity, since the effect of the gravitational force is added to the effect of the centrifugal force.

In FIG. 4, the dust discharging hole 36 is formed in the direction perpendicular to the axis x in the vicinity of the bottom surface 32 of the hub pocket 30, is formed in the shape of a cylindrical surface and has a uniform hole diameter over the entire extension of the dust discharging hole 36. The magnitude of the hole diameter of the dust discharging hole 36 is set so that the foreign matter deposited in the hub pocket 30 can be discharged from the hub pocket 30 and at the same time foreign matter is less likely to enter the hub pocket 30 from the outer periphery side of the projection 33.

Since the dust discharging hole 36 is formed in the vicinity of the bottom surface 32 of the hub pocket 30 where more foreign matter is deposited as described above, the foreign matter deposited in the hub pocket 30 can be effectively discharged. As a result, the foreign matter can be prevented from being excessively deposited on the outer circumferential surface 31, thereby preventing the foreign matter deposited in the hub pocket 30 from overflowing from the hub pocket 30 and preventing the amount of the foreign matter entering the seal lip 24 side from increasing. In addition, since the dust discharging hole 36 is formed in the direction perpendicular to the axis x, the dust discharging hole 36 can be easily formed.

Figure 5:
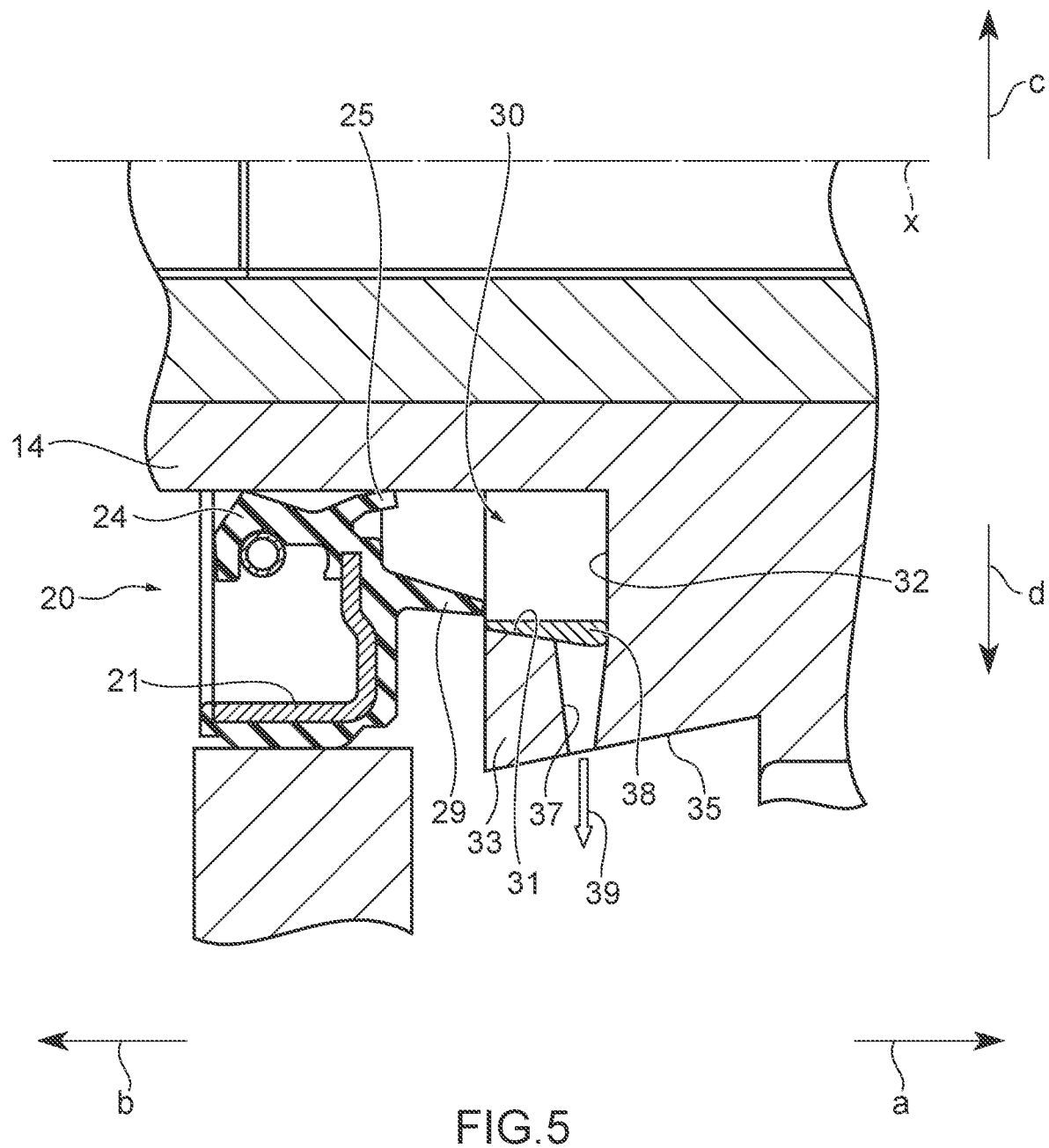
FIG. 5 is a partial enlarged cross-sectional view taken along the axis, showing a schematic configuration of a first modification example of the sealing structure with a torsional damper and an oil seal according to the first embodiment of the present disclosure.

FIG. 5 is a diagram showing a first modification example of the sealing structure with a torsional damper and an oil seal according to the first embodiment described above. In FIG. 5, a dust discharging hole 37, which is a first modification example of the dust discharging hole 36, is formed in the vicinity of the bottom surface 32 of the hub pocket 30 and is formed substantially in the shape of a conical surface as a whole with the hole diameter being larger on the inner periphery side and tapering toward the outer periphery side.

Since the dust discharging hole 37 is formed substantially in the shape of a conical surface as a whole with the hole diameter being larger on the inner periphery side and tapering toward the outer periphery side, the foreign matter deposited in the hub pocket 30 can be received in the dust discharging hole 37 of a larger area and thus can be effectively discharged, and at the same time, the smaller diameter of the discharge opening of the dust discharging hole 37 can make it less likely for foreign matter to enter the dust discharging hole 37. The effect of the formation of the dust discharging hole 37 in the vicinity of the bottom surface 32 of the hub pocket 30 is the same as in the case of the dust discharging hole 36 described above.

Figure 6:
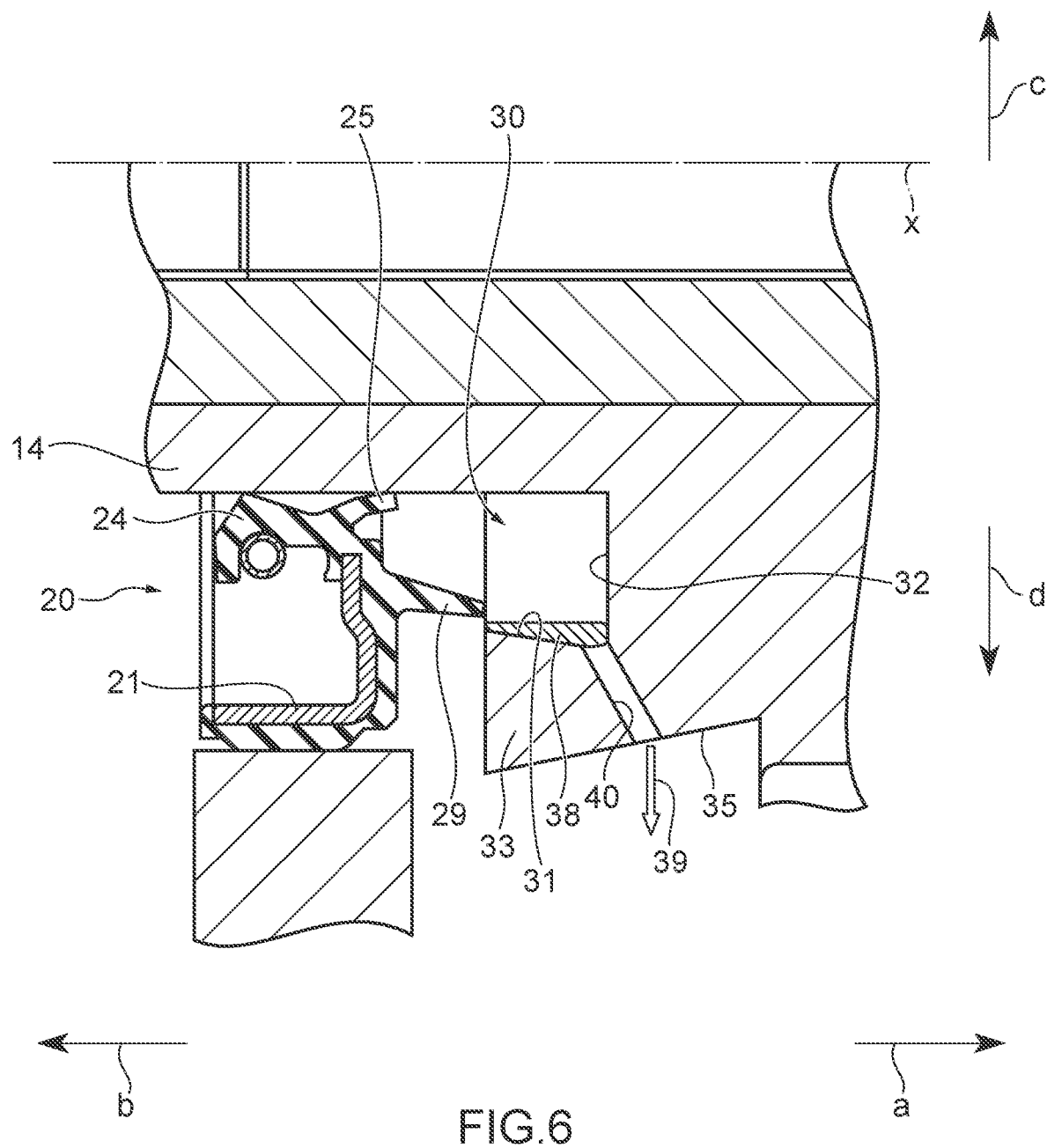
FIG. 6 is a partial enlarged cross-sectional view taken along the axis, showing a schematic configuration of a second modification example of the sealing structure with a torsional damper and an oil seal according to the first embodiment of the present disclosure.

FIG. 6 is a diagram showing a second modification example of the sealing structure with a torsional damper and an oil seal according to the first embodiment described above. As shown in FIG. 6, a dust discharging hole 40, which is a second modification example of the dust discharging hole 36, is formed in the vicinity of the bottom surface 32 of the hub pocket 30 and is formed to extend obliquely with respect to the axis x from the outer circumferential surface 31 toward the outer periphery side and the outer side, and the discharge opening of the dust discharging hole 40 on the outer periphery side faces the disk part 16. In addition, the dust discharging hole 40 is formed in the shape of a cylindrical surface and has a uniform hole diameter over the entire extension thereof.

Figure 7:
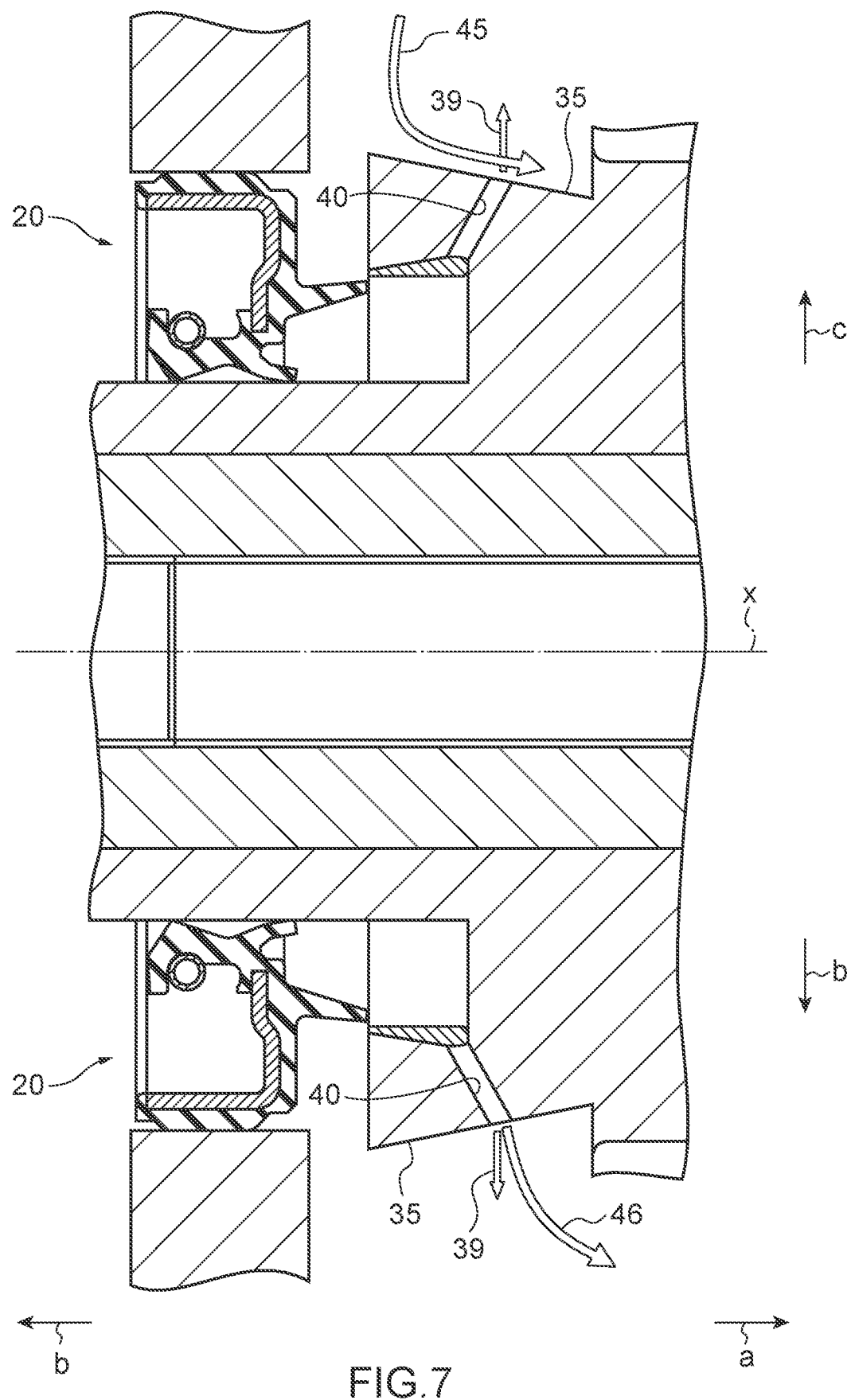
FIG. 7 is a partial enlarged cross-sectional view taken along the axis, for illustrating an operation of the second modification example of the sealing structure with a torsional damper and an oil seal according to the first embodiment of the present disclosure.

FIG. 7 is a diagram for illustrating an operation of the dust discharging hole 40. In FIG. 7, an arrow 45 indicates a foreign matter entry path along an outer periphery side surface 35 of the projection 33 of the hub pocket 30 into the dust discharging hole 40 located at an upper position in the direction of gravity, and an arrow 46 indicates a foreign matter discharge path along which the foreign matter is discharged from the discharge hole of the dust discharging hole 40 located at a lower position in the direction of gravity. Although a plurality of dust discharging holes 40 are formed in the present modification example, the same effect is achieved even in the case where only one dust discharging hole 40 is formed.

Since the dust discharging hole 40 is formed obliquely with respect to the axis x toward the outer periphery side and the outer side, and the discharge opening faces the disk part 16 as described above, as shown by the arrow 45, the discharge opening of the dust discharging hole 40 is not opposed to the direction of the arrow 45, and foreign matter is less likely to enter the discharge opening of the dust discharging hole 40 along the outer periphery side surface 35 of the projection 33 of the hub pocket 30. In addition, as shown by the arrow 46, since the discharge opening of the dust discharging hole 40 opens toward the disk part 16 and thus faces the outer side, which is opposite to the seal lip 24 side, the foreign matter discharged from the discharge opening of the dust discharging hole 40 is less likely to reach the seal lip 24. The effect of the formation of the dust discharging hole 40 in the vicinity of the bottom surface 32 of the hub pocket 30 and the effect of the shape of the cylindrical surface of the dust discharging hole 40 are the same as in the case of the dust discharging hole 36 shown in FIG. 4 described above.

Figure 8:
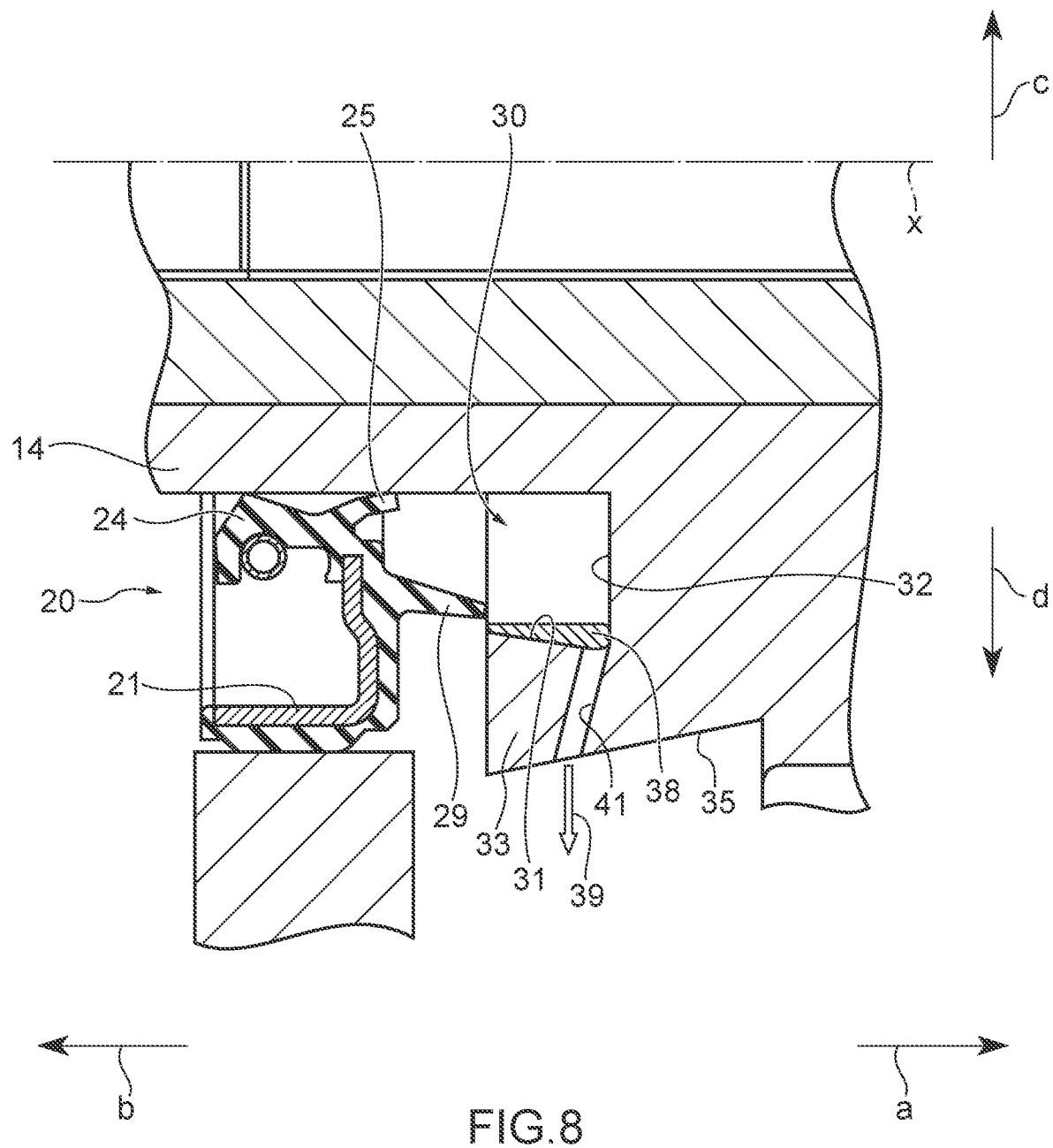
FIG. 8 is a partial enlarged cross-sectional view taken along the axis, showing a schematic configuration of a third modification example of the sealing structure with a torsional damper and an oil seal according to the first embodiment of the present disclosure.

FIG. 8 is a diagram showing a third modification example of the sealing structure 1 with a torsional damper and an oil seal according to the first embodiment. In FIG. 8, a dust discharging hole 41 is formed in the vicinity of the bottom surface 32 of the hub pocket 30 and is formed to extend obliquely with respect to the axis x from the outer circumferential surface 31 of the hub pocket 30 toward the outer periphery side and the inner side, and the discharge opening of the dust discharging hole 41 faces in the opposite direction to the disk part 16. In addition, the dust discharging hole 41 is formed in the shape of a cylindrical surface and has a uniform hole diameter over the entire extension thereof.

Figure 9:
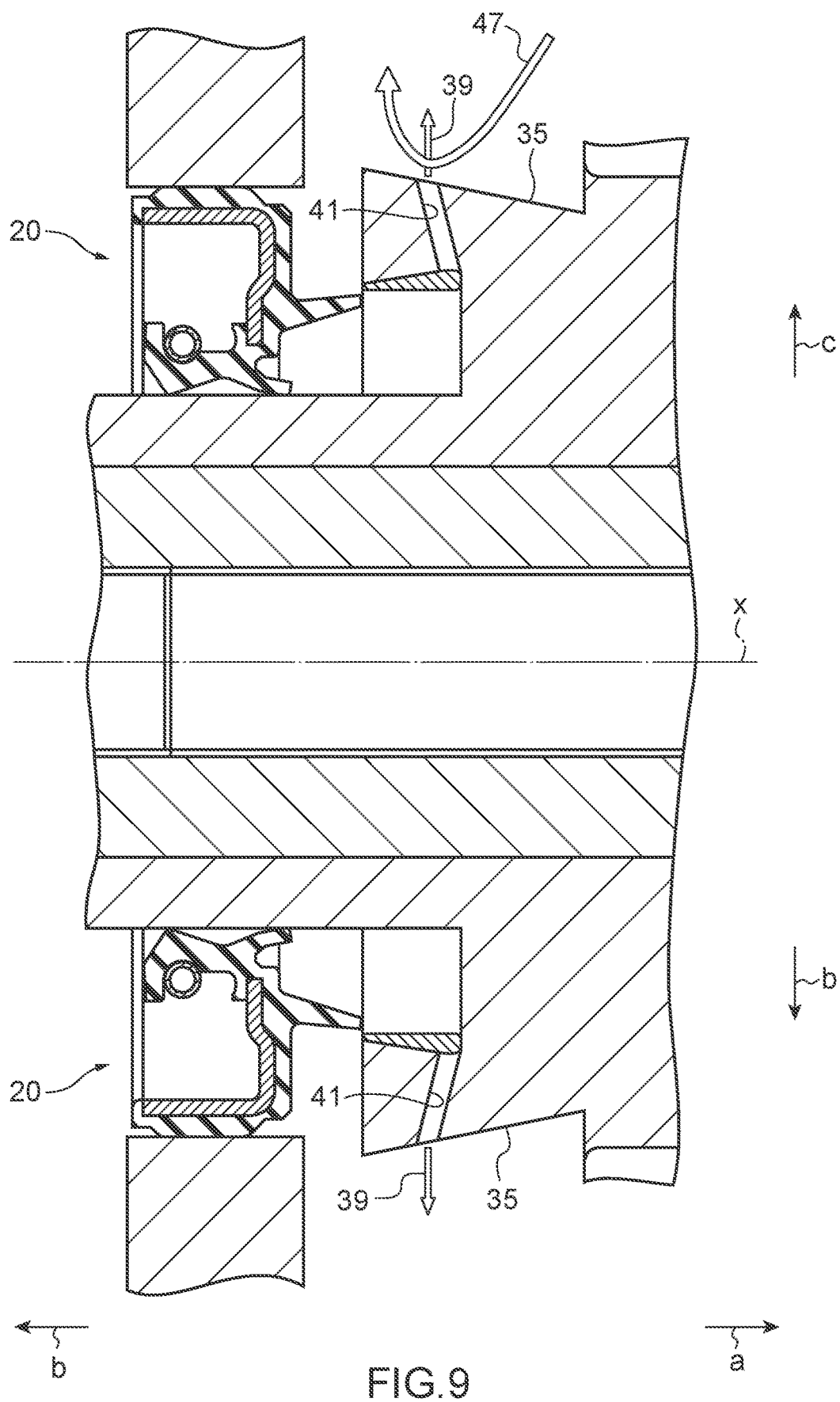
FIG. 9 is a partial cross-sectional view taken along the axis, for illustrating an operation of the third modification example of the sealing structure with a torsional damper and an oil seal according to the first embodiment of the present disclosure.

FIG. 9 is a diagram for illustrating an operation of the dust discharging hole 41. In FIG. 9, as shown by an arrow 47, even if the foreign matter having entered through the window 16a is to enter the discharge opening of the dust discharging hole 41 located at an upper position in the direction of gravity, such entry can be made less likely.

Since the dust discharging hole 41 is formed obliquely with respect to the axis x toward the outer periphery side and the inner side, and the discharge opening opens in the opposite direction to the disk part 16 as described above, as shown by the arrow 47, even if the foreign matter having passed through the window 16a is to enter the hub pocket 30 through the discharge opening of the dust discharging hole 41, the foreign matter bounces off and is less likely to enter the discharge opening of the dust discharging hole 41. As a result, the foreign matter deposited in the hub pocket 30 can be effectively discharged from the dust discharging hole 41 located at a lower position in the direction of gravity. The effect of the formation of the dust discharging hole 41 in the vicinity of the bottom surface 32 of the hub pocket 30 and the effect of the shape of the cylindrical surface of the dust discharging hole 41 are the same as in the case of the dust discharging hole 36 described above.

As described above, in the sealing structure 1 with a torsional damper and an oil seal according to the first embodiment of the present disclosure, the outer circumferential surface 31 of the hub pocket 30 that forms the labyrinth seal (the gap g1) is shaped in such a manner that the diameter increases toward the outer side, and the dust discharging hole 36 (dust discharging hole 37, 40, or 41) that penetrates the projection 33 between the outer circumferential surface 31 and the outer periphery side surface 35 is formed in the projection 33 of the hub pocket 30. Therefore, entry of foreign matter from the damper pulley 10 to the seal lip 24 side can be reduced by the labyrinth seal g1, and even if any foreign matter passes through the labyrinth seal g1, the foreign matter can be prevented from being excessively deposited in the hub pocket 30, and entry of the foreign matter further toward the seal lip 24 side can be more effectively reduced.

Second Embodiment

Next, a sealing structure with a torsional damper and an oil seal according to a second embodiment of the present disclosure will be described. A sealing structure 2 with a torsional damper and an oil seal according to the second embodiment of the present disclosure differs from the sealing structure 1 with a torsional damper and an oil seal according to the first embodiment of the present disclosure described above only in the aspect of the annular gap formed between the side lip 29 and the outer circumferential surface 31 of the hub pocket 30. In the following, only the difference will be described, and the components of the sealing structure 2 with a torsional damper and an oil seal according to the second embodiment of the present disclosure that are the same as or similar to those of the sealing structure 1 according to the first embodiment of the present disclosure described above will be denoted by the same reference numerals and will not be further described.

Figure 10:
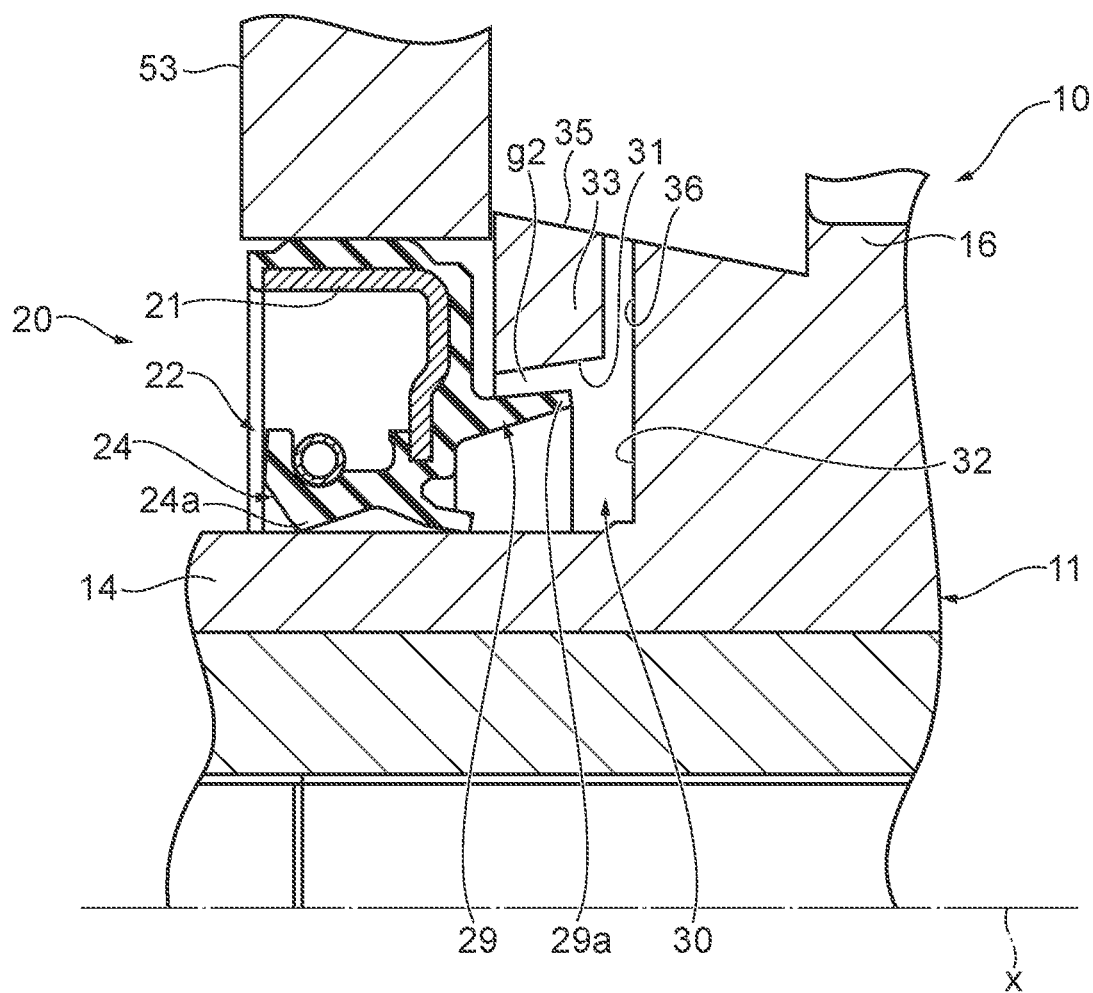
FIG. 10 is a partial enlarged cross-sectional view taken along an axis, showing a schematic configuration of a sealing structure with a torsional damper and an oil seal according to a second embodiment of the present disclosure.

FIG. 10 is a partial enlarged cross-sectional view taken along the axis x, showing a schematic configuration of the sealing structure 2 with a torsional damper and an oil seal according to the second embodiment of the present disclosure.

As shown in FIG. 10, a part of the side lip 29 of the oil seal 20 on the side of the outer end 29a thereof lies in the hub pocket 30. That is, the side lip 29 and the outer circumferential surface 31 of the hub pocket 30 are opposed to each other in the radial direction, and an annular gap g2 is formed between the side lip 29 and the outer circumferential surface 31 of the hub pocket 30. That is, the side lip 29 and the outer circumferential surface 31 of the hub pocket 30 overlap with each other.

The annular gap g2 formed by the side lip 29 and the outer circumferential surface 31 of the hub pocket 30 forms a labyrinth seal. Therefore, as with the sealing structure 1 described above, entry, further toward the seal lip 24 side, of foreign matter having entered from between the front cover 53 and the damper pulley 10 and foreign matter having entered from the outside through the windows 16a of the disk part 16 of the hub 11 can be reduced. Therefore, exposure of the seal lip 24 of the oil seal 20 to foreign matter entering from around the window 16a of damper pulley 10 can be reduced, damage to or deterioration of the lip tip end part 24a due to the lip tip end part 24a catching foreign matter can be reduced, and thus deterioration of the sealing performance of the oil seal 20 that leads to oil leakage can be reduced.

Since the dust discharging hole 36 is formed in the projection 33 that forms the hub pocket 30, as with the sealing structure 1 with a torsional damper and an oil seal according to the first embodiment described above, foreign matter can be prevented from being excessively deposited in the hub pocket 30, and even if any foreign matter passes through the labyrinth seal g2, entry of the foreign matter further toward the seal lip 24 side can be more effectively reduced.

The first modification example, the second modification example and the third modification example shown in FIGS. 5, 6 and 8 can be applied to the sealing structure 2 with a torsional damper and an oil seal according to the second embodiment of the present disclosure described above. More specifically, the dust discharging hole 37, 40, or 41 can be adopted as the dust discharging hole instead of the dust discharging hole 36 of the sealing structure 2 with a torsional damper and an oil seal shown in FIG. 10.

As described above, in the sealing structure 2 with a torsional damper and an oil seal according to the second embodiment of the present disclosure, as in the sealing structure 1 with a torsional damper and an oil seal according to the first embodiment of the present disclosure, the outer circumferential surface 31 of the hub pocket 30 that forms the labyrinth seal (the gap g2) is shaped in such a manner that the diameter increases toward the outer side, and the dust discharging hole 36 (dust discharging hole 37, 40, or 41) that penetrates the projection 33 between the outer circumferential surface 31 and the outer periphery side surface 35 is formed in the projection 33 of the hub pocket 30. Therefore, entry of foreign matter from the damper pulley 10 to the seal lip 24 side can be reduced by the labyrinth seal, and even if any foreign matter passes through the labyrinth seal g2, the foreign matter can be prevented from being excessively deposited in the hub pocket 30, and entry of the foreign matter further toward the seal lip 24 side can be more effectively reduced.

Third Embodiment

Next, a sealing structure with a torsional damper and an oil seal according to a third embodiment of the present disclosure will be described. A sealing structure 3 with a torsional damper and an oil seal according to the third embodiment of the present disclosure differs from the sealing structure 1 with a torsional damper and an oil seal according to the first embodiment of the present disclosure described above in the structure forming the hub pocket 30. In the following, only the difference will be described, and the components of the sealing structure 3 with a torsional damper and an oil seal according to the third embodiment of the present disclosure that are the same as or similar to those of the sealing structure 1 according to the first embodiment of the present disclosure described above will be denoted by the same reference numerals and will not be further described.

Figure 11:
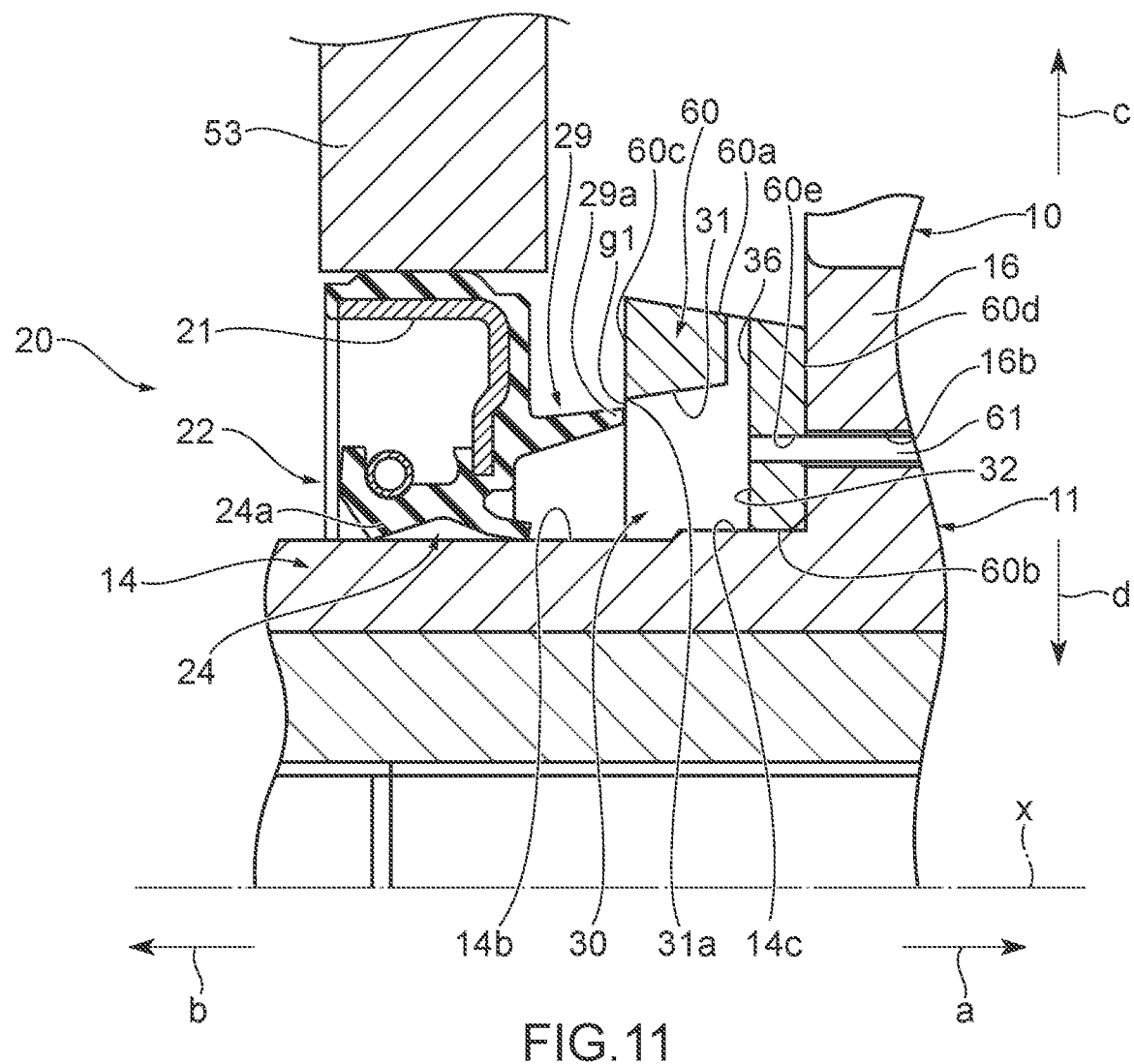
FIG. 11 is a partial enlarged cross-sectional view taken along an axis, showing a schematic configuration of a sealing structure with a torsional damper and an oil seal according to a third embodiment of the present disclosure.

FIG. 11 is a partial enlarged cross-sectional view taken along the axis x, showing a schematic configuration of the sealing structure 3 with a torsional damper and an oil seal according to the third embodiment of the present disclosure. As shown in FIG. 11, in the damper pulley 10 of the sealing structure 3 with a torsional damper and an oil seal, the outer circumferential surface 31 and the bottom surface 32 of the hub pocket 30 are not formed in the hub 11. The sealing structure 3 with a torsional damper and an oil seal has an attachment annular member 60 as an outer shell part that is separate from the hub 11 and attached to the damper pulley 10, and the outer circumferential surface 31 and the bottom surface 32 of the hub pocket 30 are formed in the attachment annular member 60.

The attachment annular member 60 is a disk-shaped hollow annular member centered about the axis x. The attachment annular member 60 is shaped to be fitted around the boss part 14 of the damper pulley 10, and a recess is formed in one side surface of the attachment annular member 60 to provide the outer circumferential surface 31 and the bottom surface 32 of the hub pocket 30. More specifically, as shown in FIG. 11, the attachment annular member 60 has an outer periphery side surface 60a, which is a surface on the outer periphery side that corresponds to the outer periphery side surface 35 of the projection 33 of the sealing structure 1 described above, and an inner periphery side surface 60b, which is a surface on the inner periphery side that defines a through-hole in which the boss part 14 of the damper pulley 10 is inserted and fitted. A recess that is recessed in the outer side direction is formed in a side surface 60c of the attachment annular member 60, which is a side surface thereof facing the inner side, to provide the outer circumferential surface 31 and the bottom surface 32 of the hub pocket 30.

The boss part 14 of the damper pulley 10 has a step surface 14c, which is connected to the outer circumferential surface 14b on the outer side. The step surface 14c has a larger diameter than the outer circumferential surface 14b and protrudes beyond the outer circumferential surface 14b outward. The outer circumferential surface 14b and the step surface 14c are smoothly connected to each other. The attachment annular member 60 is attached to the boss part 14 with the inner periphery side surface 60b fitted into the step surface 14c of the boss part 14.

The attachment annular member 60 is attached to the damper pulley 10 by a fixing member 61 in such a manner that the attachment annular member 60 cannot relatively move with respect to the damper pulley 10. In the state in which the attachment annular member 60 is attached, a side surface 60d, which is a side surface of the attachment annular member 60 facing in the outer side, is in contact with a side surface of the disk part 16. The fixing member 61 is a bolt, a rivet or a pin, for example, and fixes the attachment annular member 60 to the damper pulley 10 by being engaged with a through-hole 16b, which is a through-hole formed in the disk part 16 to extend in the direction of the axis x, and a through-hole 60e that is formed in the attachment annular member 60 to extend in the direction of the axis x between the bottom surface 32 and the side surface 40d. For example, one or both of the through-holes 16b and 60e is threaded, and the attachment annular member 60 is fixed to the damper pulley 10 by screwing a bolt serving as the fixing member 61 into the threaded hole. If the fixing member 61 is a pin or a rivet, the attachment annular member 60 is fixed to the damper pulley 10 by fitting the fixing member 61 into the through-hole 16b or 60e or engaging the fixing member 61 with the through-hole 16b or 60e. The method of fixing the attachment annular member 60 is not limited to the method described above, and any fixing member 61 that can achieve another known applicable fixing method can be used. The attachment annular member 60 is fixed to the damper pulley 10 with the fixing member 61, therefore the attachment annular member 60 is firmly fixed to the damper pulley 10.

In addition, in the attachment annular member 60, the dust discharging hole 36 of the sealing structure 1 described above is formed, and the dust discharging hole 36 penetrates the attachment annular member 60 between the outer circumferential surface 31 and the outer periphery side surface 60a. The dust discharging hole 36 is formed in the vicinity of the bottom surface 32. In the attachment annular member 60, any of the dust discharging holes 37, 40 and 41 according to the modification examples 1 to 3 described above may be formed instead of the dust discharging hole 36.

In the state in which the attachment annular member 60 is attached to the damper pulley 10, the annular gap g1 is formed between the outer end 29a of the side lip 29 of the oil seal 20 and the inner end 31a of the outer circumferential surface 31 of the hub pocket 30, as with the sealing structure 1 described above.

The material of the attachment annular member 60 may be a metal material or a resin material, for example, stainless steel or ABS resin. The resin material of the attachment annular member 60 is preferably a resin that can resist the ambient temperature of the use environment, such as an engine room.

The sealing structure 3 with a torsional damper and an oil seal according to the third embodiment of the present disclosure described above can achieve the same effects and advantages as the sealing structure 1 with a torsional damper and an oil seal according to the first embodiment of the present disclosure, and can reduce exposure of the seal lip 24 of the oil seal 20 to foreign matter entering from around the damper pulley 10.

With the sealing structure 3 with a torsional damper and an oil seal according to the third embodiment of the present disclosure, the outer circumferential surface 31 and the bottom surface 32 of the hub pocket 30 are formed in the attachment annular member 60, and therefore, the hub pocket 30 can be easily machined. With the sealing structures 1 and 2 with a torsional damper and an oil seal described earlier, the hub pocket 30 is formed in the hub 11 by cutting the hub 11 formed by casting. The hub 11 has a heavy weight, and the hub pocket 30 needs to be machined while avoiding interference between a cutting tool and the boss part 14. Thus, with the sealing structures 1 and 2 having a torsional damper and an oil seal, it is difficult to machine the hub pocket 30. To the contrary, with the sealing structure 3 having a torsional damper and an oil seal, the outer circumferential surface 31 and the bottom surface 32 of the hub pocket 30 are formed in an annular member separate from the hub 11 to provide the attachment annular member 60, and the attachment annular member 60 is attached to the damper pulley 10 to provide the hub pocket 30. Thus, the hub pocket 30 can be easily formed. In particular, the inclined outer circumferential surface 31 of the hub pocket 30 and the dust discharging hole 36 can be easily formed.

With the sealing structure 3 with a torsional damper and an oil seal according to the third embodiment of the present disclosure, the boss part 14 of the damper pulley 10 has the step surface 14c protruding in the outer periphery side direction beyond the outer circumferential surface 14b outward, and the attachment annular member 60 is fitted on the step surface 14c. As a result, when the attachment annular member 60 is fitted to the boss part 14, the outer circumferential surface 14b, which serves as a lip sliding surface with which the lip tip end part 24a of the seal lip 24 comes into contact, can be prevented from being damaged.

Fourth Embodiment

Next, a sealing structure with a torsional damper and an oil seal according to a fourth embodiment of the present disclosure will be described. A sealing structure 4 with a torsional damper and an oil seal according to the fourth embodiment of the present disclosure differs from the sealing structure 3 with a torsional damper and an oil seal according to the third embodiment of the present disclosure described above only in the shape of the annular gap formed by the side lip 29 and the outer circumferential surface 31 of the hub pocket 30. In addition, the sealing structure 4 with a torsional damper and an oil seal according to the fourth embodiment of the present disclosure differs from the sealing structure 2 with a torsional damper and an oil seal according to the second embodiment of the present disclosure described above in the structure forming the hub pocket 30, and the sealing structure 4 has the attachment annular member 60. In the following, only the differences will be described, and the components of the sealing structure 4 with a torsional damper and an oil seal according to the fourth embodiment of the present disclosure that are the same as or similar to those of the sealing structures 2 and 3 according to the second and third embodiments of the present disclosure described above will be denoted by the same reference numerals and will not be further described.

Figure 12:
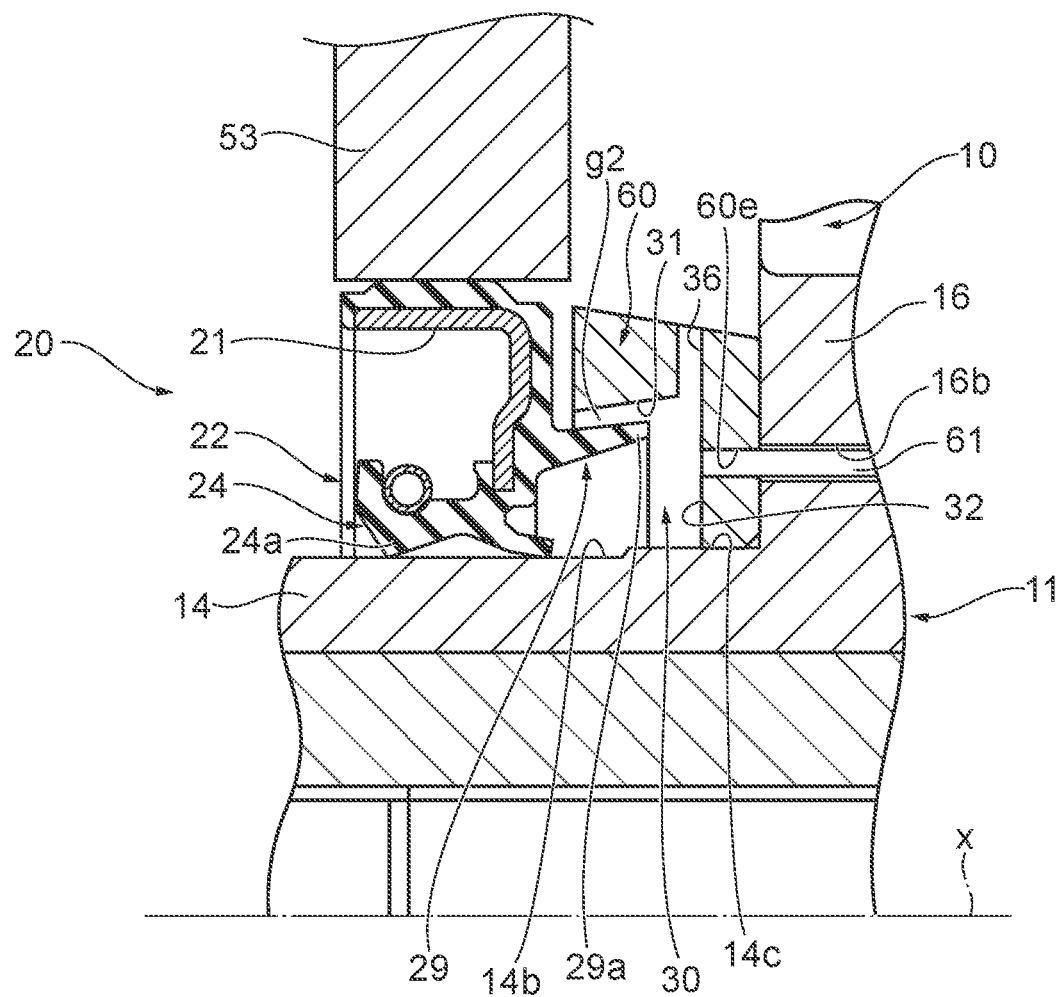
FIG. 12 is a partial enlarged cross-sectional view taken along an axis, showing a schematic configuration of a sealing structure with a torsional damper and an oil seal according to a fourth embodiment of the present disclosure.

FIG. 12 is a partial enlarged cross-sectional view taken along the axis x, showing a schematic configuration of the sealing structure 4 with a torsional damper and an oil seal according to the fourth embodiment of the present disclosure. As shown in FIG. 12, in the sealing structure 4 with a torsional damper and an oil seal, as with the sealing structure 2 with a torsional damper and an oil seal according to the second embodiment of the present disclosure, a part of the side lip 29 of the oil seal 20 on the side of the outer end 29a thereof lies in the hub pocket 30, and the side lip 29 and the outer circumferential surface 31 of the hub pocket 30 overlap with each other over the direction of the axis x in the radial direction. That is, the side lip 29 and the outer circumferential surface 31 of the hub pocket 30 are opposed to each other in the radial direction, and an annular gap g2 is formed between the side lip 29 and the outer circumferential surface 31 of the hub pocket 30 to form a labyrinth seal. With the sealing structure 4 with a torsional damper and an oil seal, the outer circumferential surface 31 of the attachment annular member 60 is elongated toward the inner side. Alternatively, the attachment annular member 60 may be attached nearer an inner side position than the attachment annular member 60 of the sealing structure 3 with a torsional damper and an oil seal according to the third embodiment of the present disclosure.

The sealing structure 4 with a torsional damper and an oil seal according to the fourth embodiment of the present disclosure having the configuration described above can achieve the same effects and advantages as the sealing structures 2 and 3 with a torsional damper and an oil seal according to the second and third embodiments of the present disclosure.

As can be seen from the above description, as with the sealing structures 2 and 3 with a torsional damper and an oil seal according to the second and third embodiments of the present disclosure, the sealing structure 4 with a torsional damper and an oil seal according to the fourth embodiment of the present disclosure can reduce exposure of the seal lip 24 of the oil seal 20 to foreign matter entering from around the damper pulley 10.

Fifth Embodiment

Figure 13A:
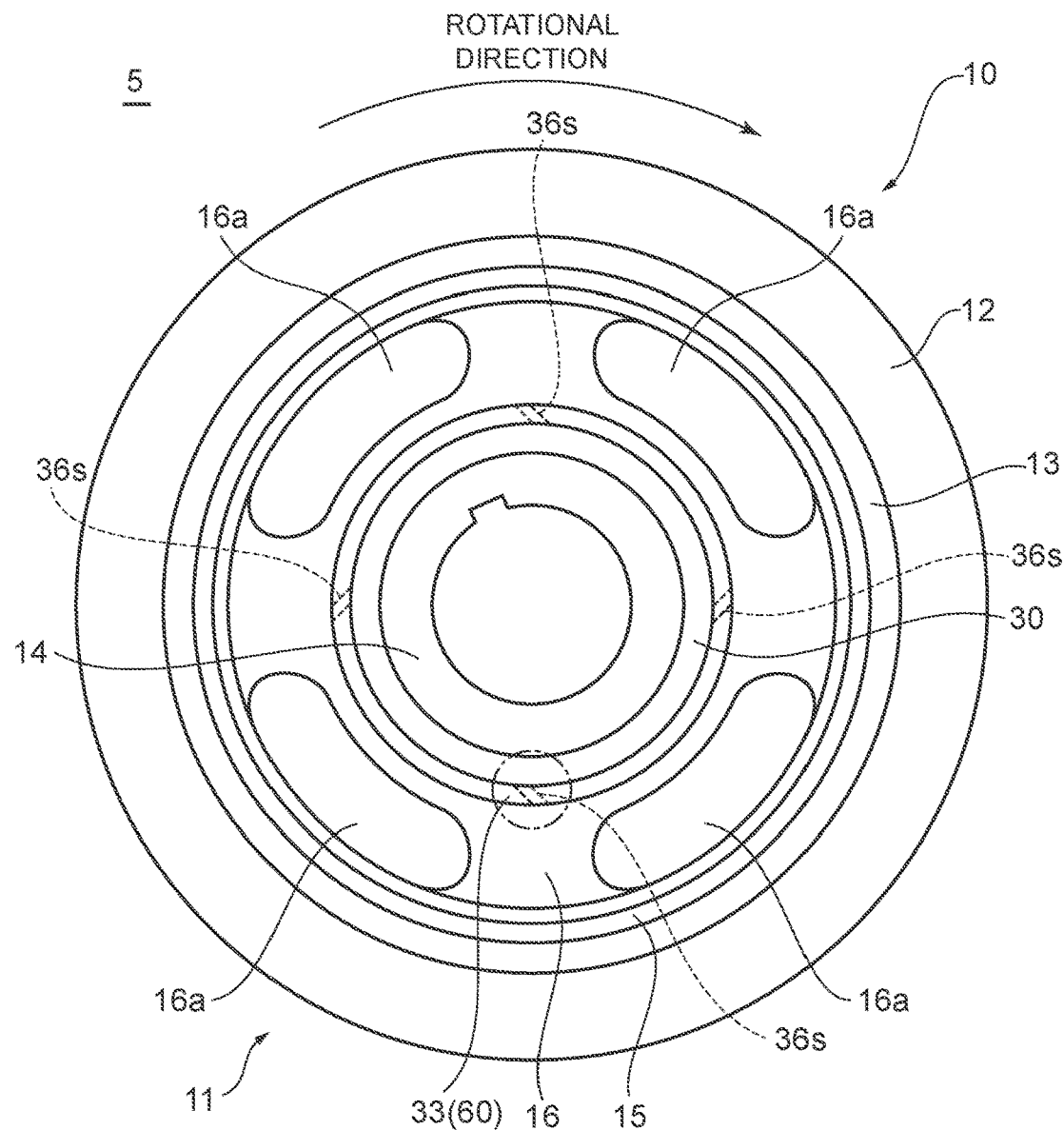
FIGS. 13A-B are a rear view and a partial enlarged view showing a configuration of a dust discharging hole formed in sealing structures according to a fifth and a ninth embodiment of the present disclosure.
Figure 13B:
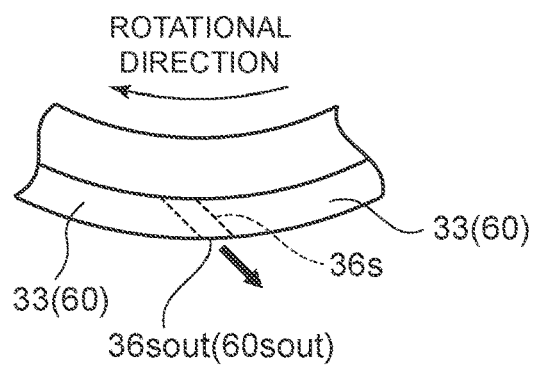

FIGS. 13(A) and 13(B) are a rear view and a partial enlarged view showing a configuration of a dust discharging hole 36s provided in a sealing structure 5 according to a fifth embodiment of the present disclosure. In the first embodiment to the fourth embodiment of the present disclosure, the dust discharging holes 36, 37, 40 and 41 are formed in the shape of a straight line extending perpendicularly to the outer circumferential surface 31 of the hub pocket 30 provided in the projection 33 from the inner periphery side to the outer periphery side. To the contrary, as shown in FIGS. 13(A) and 13(B), the sealing structure 5 according to the fifth embodiment of the present disclosure has basically the same configuration as the sealing structures 1 to 4 according to the first to fourth embodiments of the present disclosure and differs from those sealing structures only in that the sealing structure 5 has the dust discharging hole 36s that is inclined at a different inclination angle than the dust discharging holes 36, 37, 40 and 41. The dust discharging hole 36s is also spatially connected to the hub pocket 30.

The dust discharging hole 36s of the sealing structure 5 according to the fifth embodiment of the present disclosure has a discharge opening 36sout directed in an opposite direction to the rotational direction the projection 33, which is a clockwise direction in the drawings. That is, the dust discharging hole 36s is inclined at a predetermined angle with which the discharge opening 36sout is directed in the opposite direction to the rotational direction of the projection 33.

Although the inclination angle of the dust discharging hole 36s is arbitrary, the inclination angle can be set at various angles depending on the rotational speed of the projection 33, since the efficiency of discharge of foreign matter, such as dust, varies with the rotational speed of the projection 33.

Figure 14A:
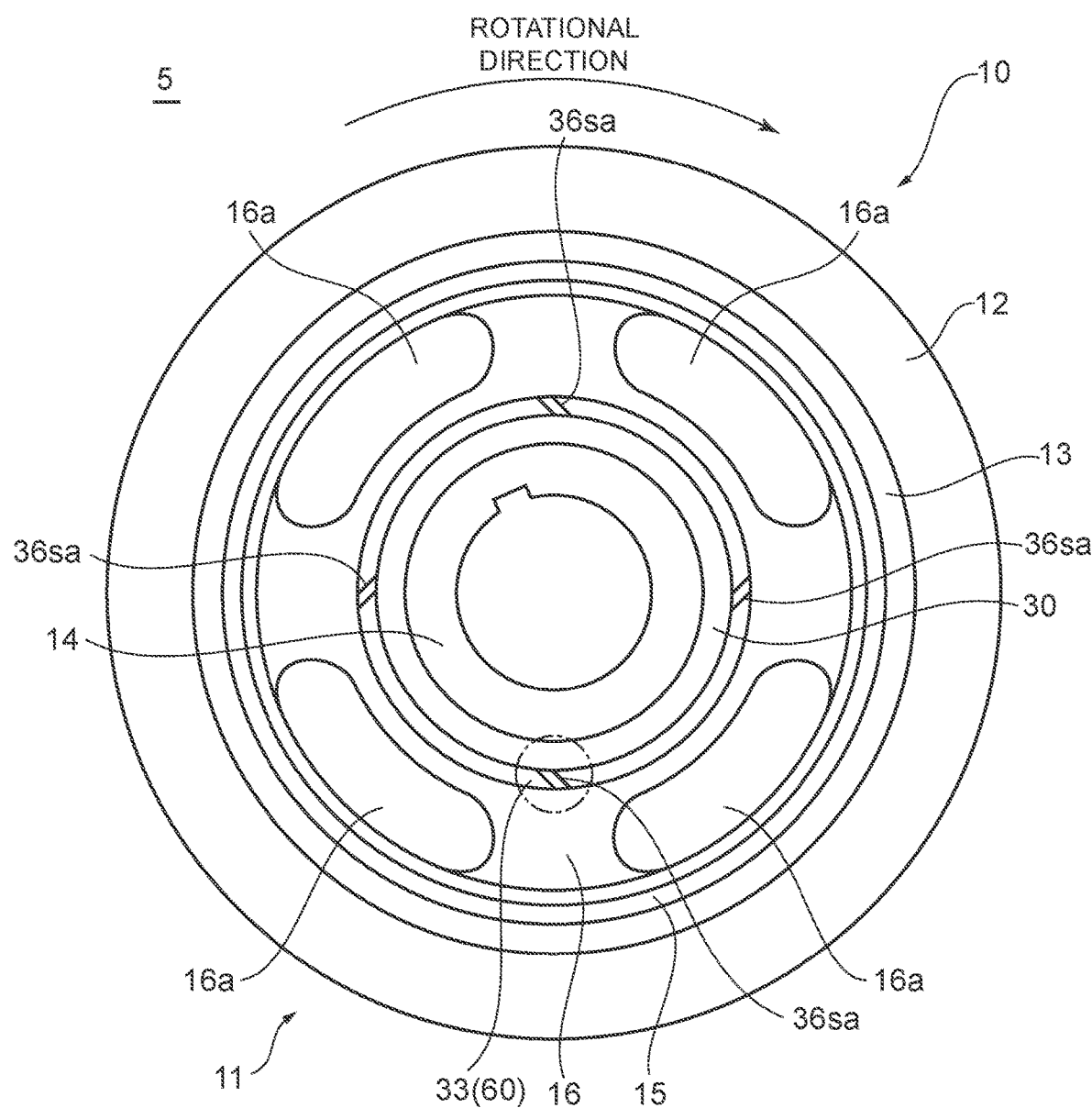
FIGS. 14A-C are a rear view, a partial enlarged view and cross-sectional view showing a configuration of a dust discharging groove, which is a modification example of the dust discharging hole, formed in the sealing structures according to the fifth and ninth embodiments of the present disclosure.
Figure 14B:
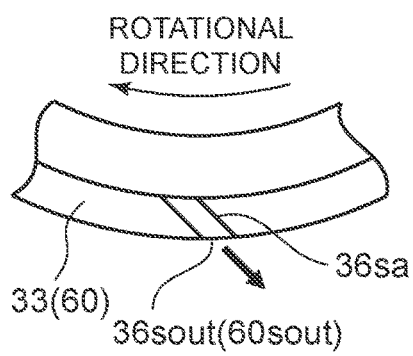
Figure 14C:
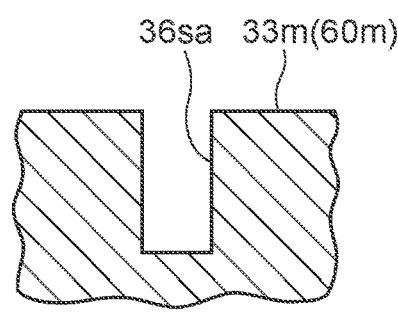

Instead of the dust discharging hole 36s, as shown in FIGS. 14(A) to 14(C), a dust discharging groove 36sa that is formed in the shape of a recess extending from an inner side surface 33m of the projection 33 of the hub 11 to the bottom surface 32 of the hub pocket 30 can also be used. In other words, the dust discharging groove 36sa is a recess-shaped groove formed to a predetermined depth from the surface 33m of the projection 33 on the inner side (in the direction of the arrow b) to the bottom surface 32 of the hub pocket 30. The dust discharging hole 36s and the dust discharging groove 36sa can be similarly provided in the attachment annular member 60 rather than in the projection 33.

Figure 15A:
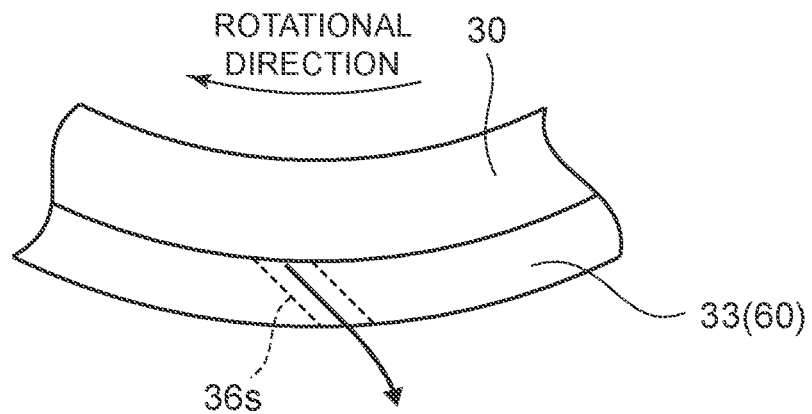
FIGS. 15A-B are a schematic diagram for helping to facilitate explanation of discharge of dust through the dust discharging hole formed in the sealing structures according to the fifth and ninth embodiments of the present disclosure.

The dust discharging hole 36s and the dust discharging groove 36sa in communication with the hub pocket 30 provided in the projection 33 of the damper pulley 10 are inclined at a predetermined angle with which the discharge opening 36sout is directed in the opposite direction to the rotational direction of the projection 33. Therefore, as shown in FIG. 15(A), foreign matter deposited in the hub pocket 30 is efficiently discharged to the outer periphery side (in the direction of the arrow c) under the centrifugal force of the rotation of the projection 33.

Figure 15B:
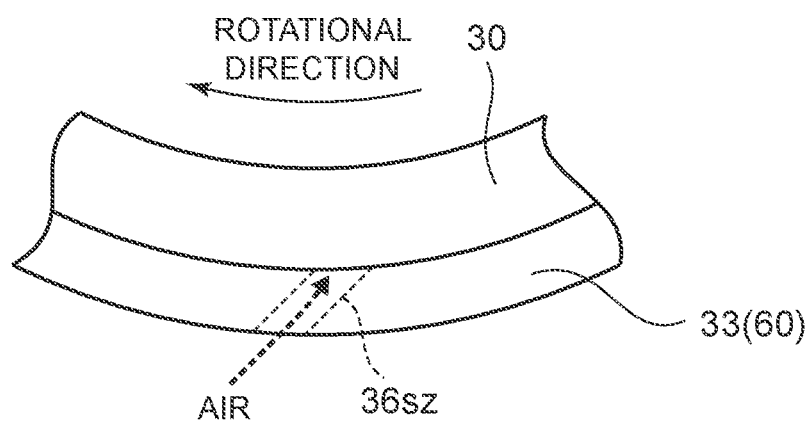

However, the inclination of the dust discharging hole 36s or the dust discharging groove 36sa is limited to cases where the discharge opening 36sout is directed in the opposite direction to the rotational direction of the projection 33. This is because, if the dust discharging hole 36s or the dust discharging groove 36sa is inclined in a manner such that the discharge opening 36sout is directed in the same direction as the rotational direction of the projection 33 as shown in FIG. 15(B), an air flow occurs from the outside into the discharge opening 36sout, and the foreign matter deposited in the hub pocket 30 is not discharged.

As described above, the sealing structure 5 according to the fifth embodiment of the present disclosure can achieve the same effects and advantages as the sealing structures 1 to 4 according to the first to fourth embodiments, and the foreign matter can be more efficiently discharged through the dust discharging hole 36s or the dust discharging groove 36sa. Therefore, exposure of the seal lip 24 of the oil seal 20 to the foreign matter entering from the damper pulley 10 can be further reduced.

Sixth Embodiment

Figure 16:
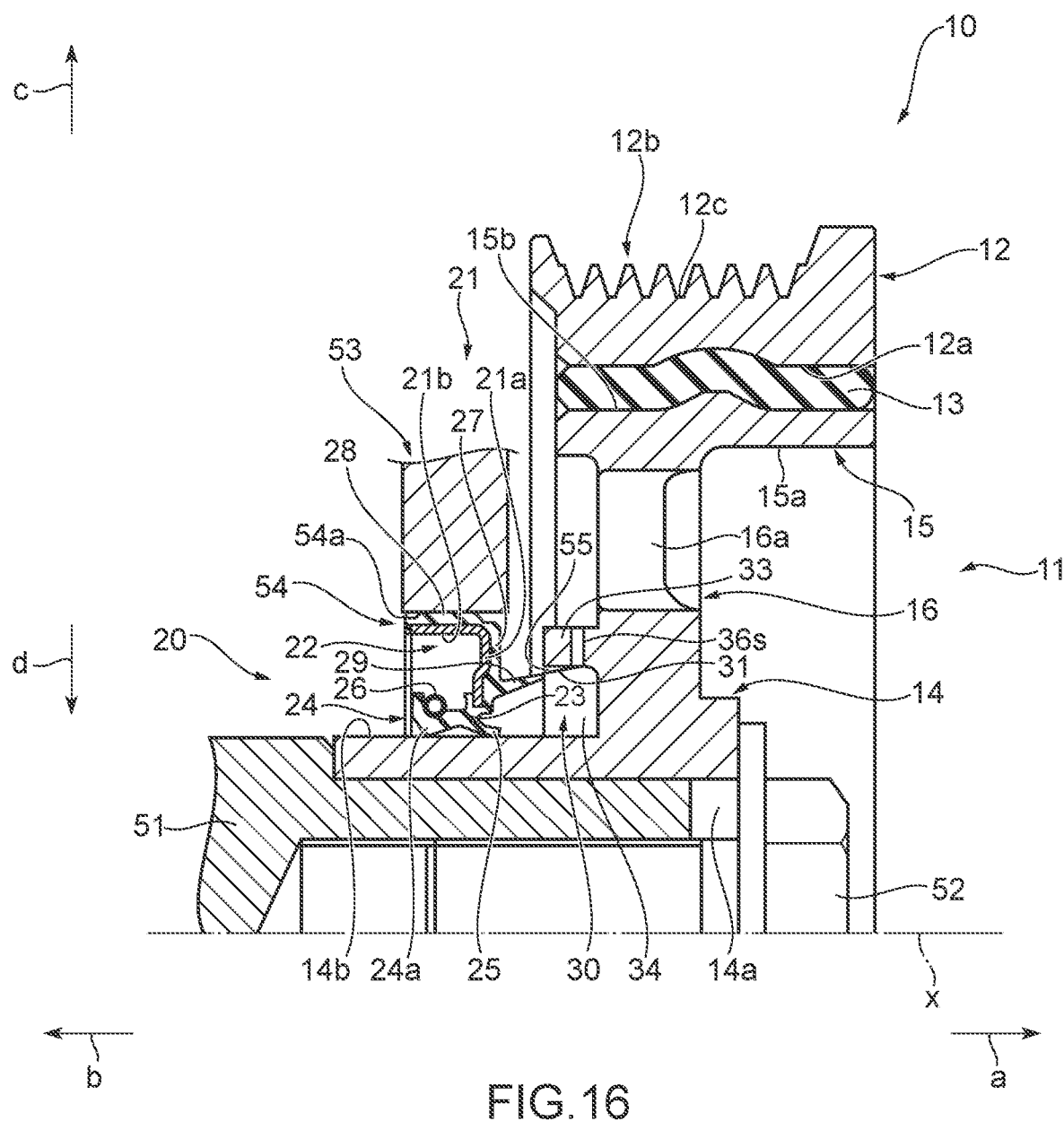
FIG. 16 is a partial cross-sectional view taken along the axis, showing a schematic configuration of a sealing structure with a torsional damper and an oil seal as a sealing structure with an annular pocket and a sealing apparatus according to a sixth embodiment of the present disclosure.

FIG. 16 is a partial cross-sectional view taken along the axis, showing a schematic configuration of a sealing structure with a torsional damper and an oil seal as a sealing structure with an annular pocket and a sealing apparatus according to a sixth embodiment of the present disclosure. The sealing structure with a torsional damper and an oil seal according to the sixth embodiment of the present disclosure is a sealing structure with an annular pocket and a sealing apparatus according to the present disclosure used between a torsional damper and an oil seal of an engine of an automobile. In the following, for convenience of explanation, an arrow a (see FIG. 16) direction in a direction of an axis x will be referred to as an outer side (one side), and an arrow b (see FIG. 16) direction in the direction of the axis x will be referred to as an inner side (another side). More specifically, the outer side is the direction away from the space to be sealed, and the inner side is the direction toward the space to be sealed. In a direction perpendicular to the axis x (which will also be referred to as "a radial direction"), the direction away from the axis x (indicated by an arrow c in FIG. 16) will be referred to as an outer periphery side, and the direction toward the axis x (indicated by an arrow d in FIG. 16) will be referred to as an inner periphery side.

As shown in FIG. 16, a sealing structure 6 with a torsional damper and an oil seal according to the sixth embodiment of the present disclosure includes a damper pulley 10 as the torsional damper as a functional member and an oil seal 20 as a sealing apparatus. The damper pulley 10 is fixed to one end of a crankshaft 51 of the engine by a bolt 52, and the oil seal 20 forms a seal between a through-hole 54 of a front cover 53 of the engine and the damper pulley 10.

The damper pulley 10 includes a hub 11, a pulley 12 as a mass body, and a damper elastic body 13 disposed between the hub 11 and the pulley 12. The hub 11 is an annular member around the axis x or, more specifically, an annular member centered or substantially centered about the axis x and includes a boss part 14 on the inner periphery side, a rim part 15 on the outer periphery side, and a disk part 16 having a circular disk-like or a substantially circular disk-like shape that connects the boss part 14 and the rim part 15 to each other. The hub 11 is molded or otherwise formed from a metal material, for example.

In the hub 11, the boss part 14 is an annular part that has a through-hole 14a and is centered or substantially centered about the axis x, and the disk part 16 extends in the outer periphery direction from an outer circumferential surface of an outer side part of the boss part 14. The boss part 14 has an outer circumferential surface 14b, which is a cylindrical outer periphery side surface of an inner side part thereof, and the outer circumferential surface 14b is a smooth surface and serves as a sealing surface for the oil seal 20 as described later. The rim part 15 is an annular, or more specifically, cylindrical part centered or substantially centered about the axis x, and the rim part 15 is a part located further on the outer periphery side than the boss part 14, concentrically with the boss part 14. The disk part 16 extends in the inner periphery direction from an inner circumferential surface 15a, which is a surface of the rim part 15 on the inner periphery side. The damper elastic body 13 is in pressure-contact with an outer circumferential surface 15b, which is a surface of the rim part 15 on the outer periphery side.

Figure 17:
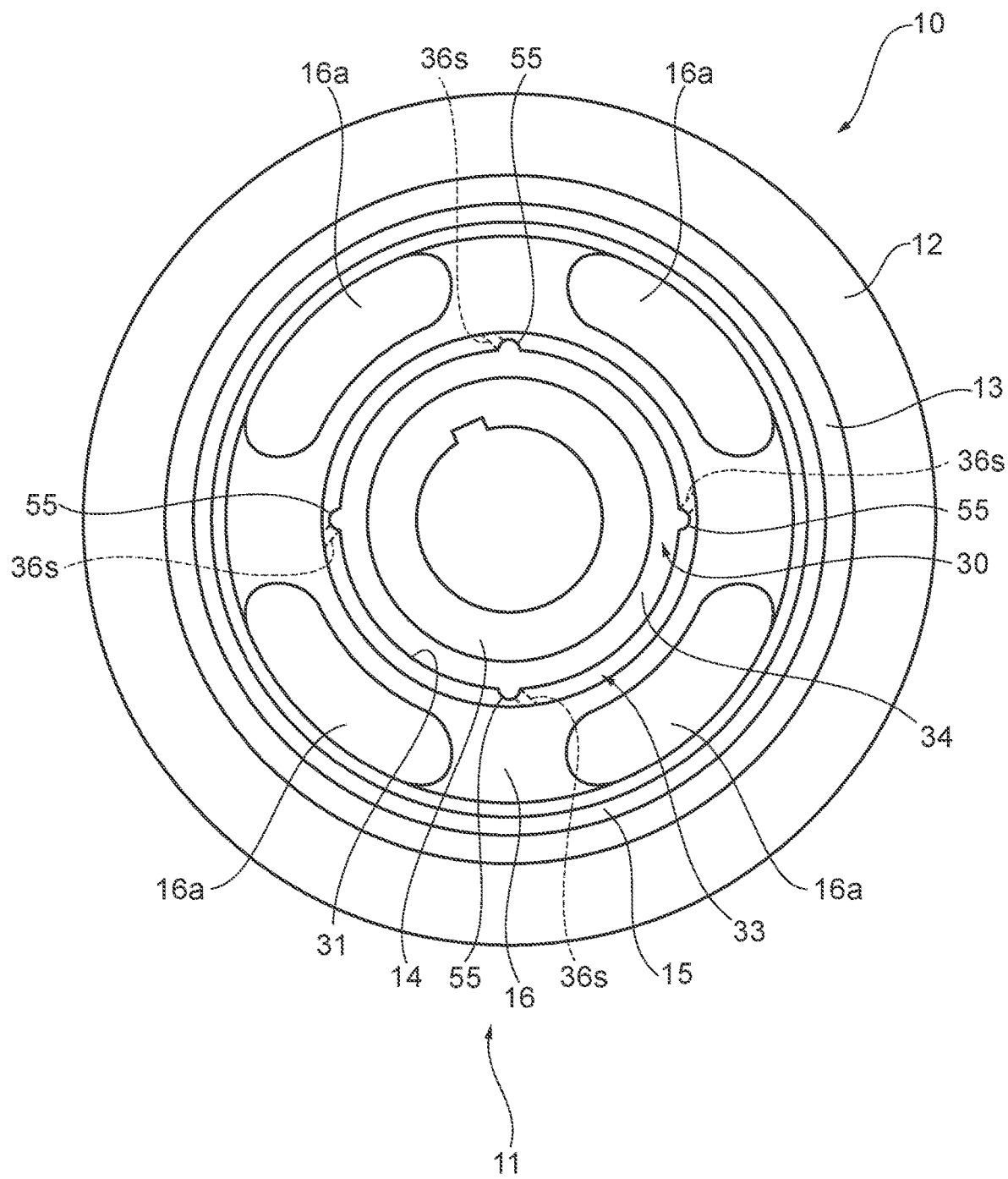
FIG. 17 is a rear view showing a schematic structure of the torsional damper of the sealing structure shown in FIG. 16.

The disk part 16 extends between the boss part 14 and the rim part 15 and connects the boss part 14 and the rim part 15 to each other. The disk part 16 may extend in a direction perpendicular to the axis x or in a direction oblique to the axis x. The cross section of the disk part 16 taken along the axis x (also referred to simply as "cross section") may be curved or straight. As shown in FIGS. 16 and 17, the disk part 16 has at least one window 16a, which is a through-hole penetrating the disk part 16 between the inner side and the outer side. According to the sixth embodiment, four windows 16a are formed concentrically about the axis x at regular angular intervals (see FIG. 17). The windows 16a are intended to reduce the weight of the hub 11 and thus the damper pulley 10.

The pulley 12 is an annular member centered or substantially centered about the axis x and is shaped to cover the hub 11 on the outer periphery side. More specifically, an inner circumferential surface 12a, which is a surface of the pulley 12 on the inner periphery side, has a shape that conforms with the shape of the outer circumferential surface 15b of the rim part 15 of the hub 11, and as shown in FIG. 16, the pulley 12 is positioned in such a manner that the inner circumferential surface 12a is radially opposed at a distance to the outer circumferential surface 15b of the rim part 15. In the outer circumferential surface 12b, which is a surface of the pulley 12 on the outer periphery side, a plurality of annular V-shaped grooves 12c are formed so that a timing belt (not shown) can be wound around the pulley 12.

The damper elastic body 13 is disposed between the pulley 12 and the rim part 15 of the hub 11. The damper elastic body 13 is a damper rubber member and is molded by cross-linking (vulcanization) of a rubber-like elastic material having high heat resistance, high cold resistance and high fatigue strength. The damper elastic body 13 is press-fitted between the pulley 12 and the rim part 15 of the hub 11, and fitted and fastened between the inner circumferential surface 12a of the pulley 12 and the outer circumferential surface 15b of the rim part 15.

In the damper pulley 10, the pulley 12 and the damper elastic body 13 form a damper section, and the natural frequency in the torsional direction of the damper section is tuned to agree with the natural frequency in the torsional direction of the crankshaft 51, which lies within a predetermined frequency range in which the torsional angle of the crankshaft 51 is at the maximum. That is, the inertial mass of the pulley 12 in the circumferential direction and the shear spring constant of the damper elastic body 13 in the torsional direction are adjusted so that the natural frequency in the torsional direction of the damper section agrees with the natural frequency in the torsional direction of the crankshaft 51. The damper pulley 10 may not be of a so-called single-mass type shown in the drawings but may be of a double-mass type that has two inertial masses (mass bodies) or of a type that has a plurality of inertial masses.

The damper pulley 10 further has an annular hub pocket 30 centered about the axis x that is recessed toward the outer side (one side) in the direction of the axis x and circumferentially extends along the boss part 14 of the hub 11. The hub pocket 30 will be described in detail later with reference to FIG. 18.

As described above, the damper pulley 10 is attached to one end of the crankshaft 51. More specifically, as shown in FIG. 16, the damper pulley 10 is fixed to the crankshaft 51 by inserting one end of the crankshaft 51 into the through-hole 14a of the boss part 14 of the hub 11 and screwing the bolt 52 into the crankshaft 51 from the outer side. A key to be engaged with the crankshaft 51 and the boss part 14, such as a Woodruff key, is provided between the crankshaft 51 and the boss part 14 to prevent the damper pulley 10 from rotating relative to the crankshaft 51.

When attached to the crankshaft 51, the damper pulley 10 is in a state where the inner part of the boss part 14 having the outer circumferential surface 14b is inserted in the through-hole 54 of the front cover 53, and there is an annular gap between the outer circumferential surface 14b of the boss part 14 and the through-hole 54 of the front cover 53.

As shown in FIG. 16, the oil seal 20 includes a reinforcing ring 21 that is made of a metal and has an annular shape centered or substantially centered about the axis x and an elastic body part 22 that is made of an elastic material and has an annular shape centered or substantially centered about the axis x. The elastic body part 22 is integrally attached to the reinforcing ring 21. The metal forming the reinforcing ring 21 may be stainless steel or SPCC (cold rolled steel sheet), for example. The elastic material forming the elastic body part 22 may be various rubber materials, for example. The various rubber materials include synthetic rubbers, such as nitrile rubber (NBR), hydrogenated nitrile rubber (H-NBR), acrylic rubber (ACM) or fluororubber (FKM).

The reinforcing ring 21 has a substantially L-shaped cross section and has a disk part 21a and a cylindrical part 21b. The disk part 21a is a hollow disk-shaped part that extends in a direction perpendicular to or substantially perpendicular to the axis x, and the cylindrical part 21b is a cylindrical or substantially cylindrical part that extends inwardly in the direction of the axis x from an outer periphery side end of the disk part 21a.

The elastic body part 22 is attached to the reinforcing ring 21. In the sixth embodiment, the elastic body part 22 is formed integrally with the reinforcing ring 21 to cover the reinforcing ring 21 from the outer side and the outer periphery side. The elastic body part 22 includes a lip waist part 23, a seal lip 24, and a dust lip 25. As shown in FIG. 16, the lip waist part 23 is a part located in the vicinity of an inner periphery side end of the disk part 21a of the reinforcing ring 21, and the seal lip 24 is a part that extends toward the inner side from the lip waist part 23 and is placed to be opposed to the cylindrical part 21b of the reinforcing ring 21. The dust lip 25 extends from the lip waist part 23 in the direction of the axis x.

The seal lip 24 has, at the inner side end, an annular lip tip end part 24a having a cross section whose shape is a wedge shape protruding in the inner periphery side direction. The lip tip end part 24a is shaped to come into intimate contact with the outer circumferential surface 14b of the boss part 14 of the hub 11 in a slidable manner, and to form a seal between the lip tip end part 24a and the damper pulley 10, as described later. On the outer peripheral part side of the seal lip 24, a garter spring 26 is fitted, and the garter spring 26 exerts a tightening force in the inner periphery side direction on the seal lip 24.

The dust lip 25 is a part that extends from the lip waist part 23 toward the outer side and the inner periphery side. The dust lip 25 prevents entry of foreign matter toward the lip tip end part 24a during use.

The elastic body part 22 includes a rear cover 27 and a gasket part 28. The rear cover 27 covers the disk part 21a of the reinforcing ring 21 from the outer side, and the gasket part 28 covers the cylindrical part 21b of the reinforcing ring 21 from the outer periphery side.

The oil seal 20 includes a side lip 29 that extends in the outer side direction. The side lip 29 will be described in detail later with reference to FIG. 18.

The reinforcing ring 21 is manufactured by press working or forging, for example, and the elastic body part 22 is molded with a mold by cross-linking (vulcanization). In the cross-linking, the reinforcing ring 21 is placed inside the mold, and the elastic body part 22 is bonded to the reinforcing ring 21 by cross-linking (vulcanization) bonding, and then the elastic body part 22 is integrally molded with the reinforcing ring 21.

As described above, the oil seal 20 seals the gap formed between the through-hole 54 of the front cover 53 and the outer circumferential surface 14b of the boss part 14 of the damper pulley 10. More specifically, the oil seal 20 is press-fitted into and thereby attached to the through-hole 54 of the front cover 53, and the gasket part 28 of the elastic body part 22 is compressed and abuts in a fluid tight manner against an inner circumferential surface 54a, which is the inner periphery side surface of the through-hole 54. In this way, a seal is formed between the oil seal 20 and the through-hole 54 of the front cover 53. On the other hand, the lip tip end part 24a of the seal lip 24 abuts in a liquid tight manner against the outer circumferential surface 14b of the boss part 14 of the hub 11, and in this way, a seal is formed between the oil seal 20 and the damper pulley 10.

Figure 18:
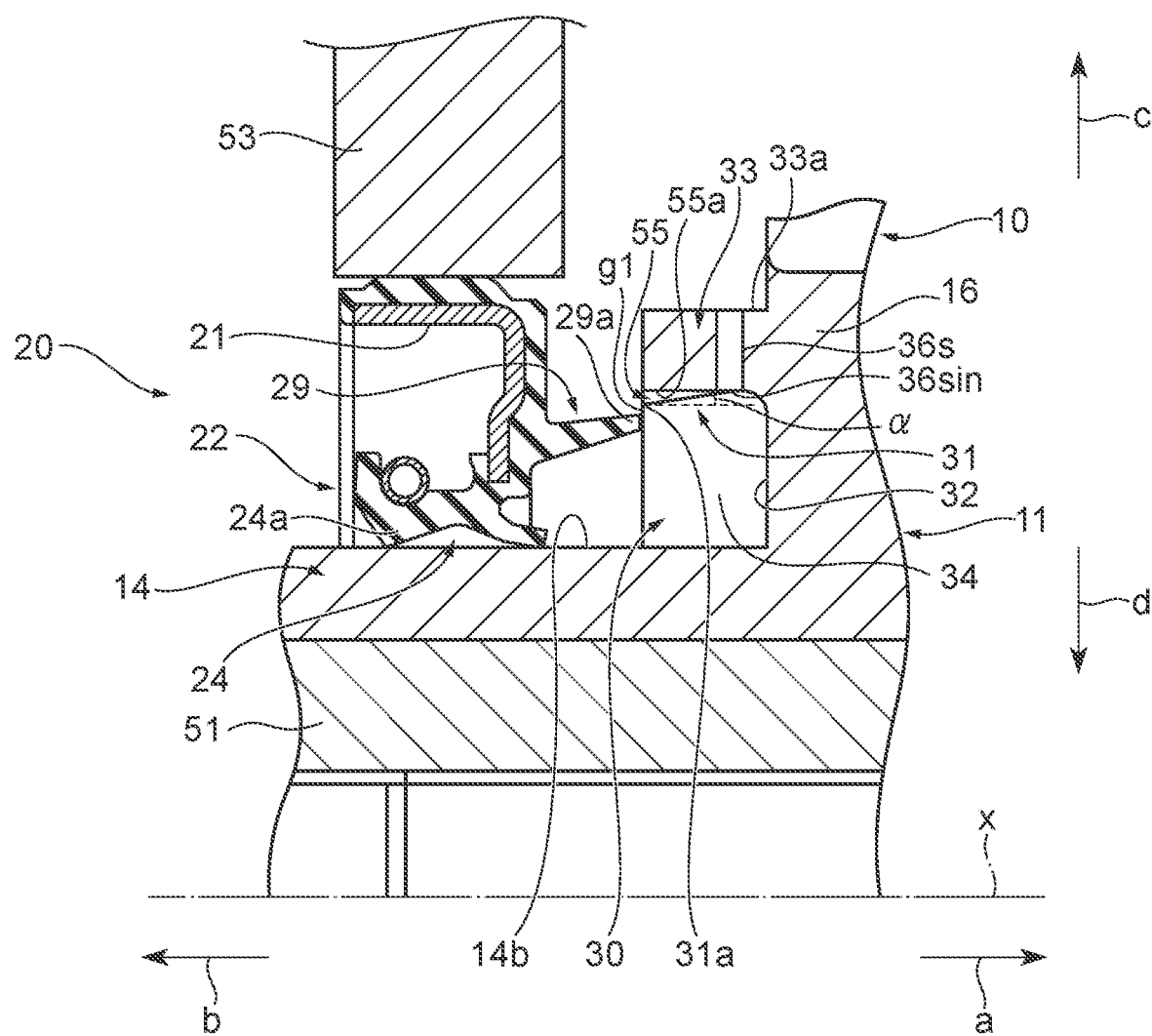
FIG. 18 is a partial enlarged cross-sectional view showing the sealing structure with a torsional damper and an oil seal shown in FIG. 16.

Next, the hub pocket 30 of the damper pulley 10 and the side lip 29 of the oil seal 20 will be described with reference to FIG. 18. FIG. 18 is a partial enlarged cross-sectional view of the sealing structure 6 with a torsional damper and an oil seal.

As shown in FIG. 18, the hub pocket 30 has the outer circumferential surface 31, which is an annular surface that extends along the axis x around the axis x, and has a recess 34, which is an annular part around the axis x that is recessed toward the outer side in the direction of the axis x. The hub pocket 30 is formed in the damper pulley 10 on the inner side of the disk part 16, and the hub pocket 30 is an annular recess that is recessed toward the outer side and extends to surround the outer circumferential surface 14b of the boss part 14. More specifically, the outer circumferential surface 31 of the hub pocket 30 is formed by a projection 33 that is an annular part that protrudes from the disk part 16 of the hub 11 toward the inner side and surrounds the boss part 14 on the outer periphery side, and an annular inner circumferential surface of the projection 33 opposed to the outer circumferential surface 14b of the boss part 14 forms the outer circumferential surface 31. The hub pocket 30 is defined by the outer circumferential surface 31, a bottom surface 32 that extends between the outer circumferential surface 31 and the outer circumferential surface 14b of the boss part 14, and the outer circumferential surface 14b of the boss part 14.

The outer circumferential surface 31 of the hub pocket 30 increases in the diameter toward the outer side (one side) in the direction of the axis x and is an annular surface expanding toward the outer periphery side, toward the outer side in the direction of the axis x. For example, the outer circumferential surface 31 is a tapered surface in a conical or substantially conical surface shape centered or substantially centered about the axis x.

The hub pocket 30 may be defined by the annular projection 33, which extends in the inner side direction from the disk part 16 of the hub 11, forming the outer circumferential surface 31 as described above, or by forming the outer circumferential surface 31 by forming the recess 34 that is recessed in the outer side direction in the disk part 16. In the latter case, an outer circumferential surface of the recess 34 constitutes the outer circumferential surface 31. The hub pocket 30 may be formed by the projection 33 and the recess formed in the disk part 16.

In the sealing structure 6, in the projection 33 forming the hub pocket 30, a dust discharging hole 36s that penetrates the projection 33 from the outer circumferential surface 31 is formed. More specifically, the dust discharging hole 36s is a through-hole that penetrates the projection 33, extends in the radial direction from the outer circumferential surface 31 toward the outer periphery side, and connects the hub pocket 30 and a space on the outer periphery side of the projection 33. The dust discharging hole 36s is formed at a location in the vicinity of the bottom surface 32. One or more dust discharging holes 36s can be formed. In the case where a plurality of dust discharging holes 36s are provided, it is desirable that the dust discharging holes 36s are distributed at regular intervals to prevent foreign matter from being deposited nonuniformly in the circumferential direction. In the present embodiment, as shown in FIG. 17, four dust discharging holes 36s are provided at regular angular intervals in the circumferential direction. The expression "the dust discharging hole 36s is formed at a location in the vicinity of the bottom surface 32" is not limited to the case where the outer side edge of the dust discharging hole 36s is flush with the bottom surface 32 as shown in FIG. 16 but includes cases where the dust discharging hole 36s is provided closer to the bottom surface 32 than a midpoint of the outer circumferential surface 31 in the direction of the axis x, and it is preferred that the position of the dust discharging hole 36s be as close to the bottom surface 32 as possible. In the case where the hub pocket 30 is formed in the disk part 16 serving as an outer shell part rather than in the projection 33, the dust discharging hole 36s is formed in the disk part 16.

As shown in FIGS. 13(A) and 13(B) and 17, the dust discharging hole 36s has a discharge opening 36sout directed in an opposite direction to the rotational direction of the projection 33, which is a clockwise direction in the drawings. That is, the dust discharging hole 36s is inclined at a predetermined angle with which the discharge opening 36sout is directed in the opposite direction to the rotational direction of the projection 33.

Although the inclination angle of the dust discharging hole 36s is arbitrary, the inclination angle can be set at various angles depending on the rotational speed of the projection 33, since the efficiency of discharge of foreign matter, such as dust, varies with the rotational speed of the projection 33.

In the sealing structure 6, instead of the dust discharging hole 36s, as shown in FIGS. 14(A) to 14(C), a dust discharging groove 36sa that is formed in the shape of a recess extending from an inner side surface 33m of the projection 33 of the hub 11 to the bottom surface 32 of the hub pocket 30 can also be used. In other words, the dust discharging groove 36sa is a recess-shaped groove formed to a predetermined depth from the surface 33m of the projection 33 on the inner side (in the direction of the arrow b) to the bottom surface 32 of the hub pocket 30.

In the sealing structure 6, the dust discharging hole 36s and the dust discharging groove 36sa in communication with the hub pocket 30 provided in the projection 33 of the damper pulley 10 are inclined at a predetermined angle with which the discharge opening 36sout is directed in the opposite direction to the rotational direction of the projection 33 or the attachment annular member 60. Therefore, as shown in FIG. 15(A), foreign matter deposited in the hub pocket 30 is efficiently discharged to the outer periphery side (in the direction of the arrow c) under the centrifugal force of the rotation of the projection 33.

As shown in FIG. 18, the side lip 29 of the oil seal 20 extends toward the outer side (the one side in the direction of the axis x). More specifically, the side lip 29 extends in parallel with the axis x or in a direction oblique to the axis x in the outer side direction and the outer periphery side direction. An outer end 29a, which is an outer side end part of the side lip 29, is located on the inner periphery side in the radial direction than an inner end 31a, which is an inner side end part of the outer circumferential surface 31 of the hub pocket 30, and does not enter the inside of the hub pocket 30 in the direction of the axis x (the outer side direction). An annular gap g1 is formed between the outer end 29a of the side lip 29 and the inner end 31a of the outer circumferential surface 31 of the hub pocket 30.

The annular gap g1 formed between the outer end 29a of the side lip 29 and the inner end 31a of the outer circumferential surface 31 of the hub pocket 30 provides a labyrinth seal. Therefore, even if foreign matter, such as muddy water, sand, or dust enters from the outside not only through a gap between the front cover 53 and the damper pulley 10 but also through the windows 16a of the disk part 16 of the hub 11, the labyrinth seal (the gap g1) formed by the side lip 29 and the hub pocket 30 reduces entry of the foreign matter further toward the seal lip 24 side. Thus, exposure of the seal lip 24 of the oil seal 20 to the foreign matter entering from the outside can be further reduced. Thus, damage to or deterioration of the lip tip end part 24a due to the lip tip end part 24a catching foreign matter can be reduced, and thus deterioration of the sealing performance of the oil seal 20 that leads to oil leakage can be reduced.

Since the outer circumferential surface 31 of the hub pocket 30 that forms the labyrinth seal (the gap g1) is shaped in such a manner that the diameter increases toward the outer side as described above, entry of foreign matter further toward the seal lip 24 side can be more effectively reduced at the labyrinth seal.

As described above, entry of foreign matter further to the seal lip 24 side beyond the gap g1 is reduced by the labyrinth seal (the gap g1) formed by the outer circumferential surface 31 of the hub pocket 30 and the side lip 29 of the oil seal 20. However, if foreign matter goes beyond the gap g1, the foreign matter can be deposited on the outer circumferential surface 31 of the hub pocket 30. The diameter of the outer circumferential surface 31 increases toward the disk part 16 side of the hub 11, and the foreign matter is likely to be deposited in the depth of the outer circumferential surface 31 (on the disk part 16 side). If foreign matter is deposited on the outer circumferential surface 31, the sealing effect of the labyrinth seal (the gap g1) can be reduced, or the foreign matter deposited can disadvantageously move toward the seal lip 24 side. In view of this, in the sealing structure with an annular pocket and a sealing apparatus according to the present disclosure, a foreign matter discharging groove 55 is provided to reduce deposition of foreign matter on the outer circumferential surface 31 or in the hub pocket 30.

As shown in FIGS. 17 and 18, the foreign matter discharging groove 55 is formed in the outer circumferential surface 31 of the hub pocket 30, and is a groove that is recessed in the outer periphery side direction and extends from one side (the outer side) toward the other side (the inner side) in the direction of the axis x. The outer circumferential surface 31 of the hub pocket 30 has at least one foreign matter discharging groove 55 and, in the present embodiment, has a plurality of foreign matter discharging grooves 55 formed at regular angular intervals in the circumferential direction. For example, as shown in FIG. 17, the outer circumferential surface 31 has four foreign matter discharging grooves 55.

The foreign matter discharging groove 55 is formed in such a manner that a bottom part 55a, which is a part on the outer periphery side, extends along the axis x in the radial direction. For example, the bottom part 55a of the foreign matter discharging groove 55 extends in the radial direction at a uniform distance from the axis x over the direction of extension of the foreign matter discharging groove 55. The bottom part 55a, which is a part of the foreign matter discharging groove 55 on the outer periphery side, is a part defined by a trajectory of a point that is farthest from the axis x in a contour of each cross section of the foreign matter discharging groove 55 taken along a plane perpendicular to the axis x over the direction of extension of the foreign matter discharging groove 55 between an outer side end part and an inner side end part of the foreign matter discharging groove 55. The bottom part 55a of the foreign matter discharging groove 55 may extend to deviate from the axis x as it goes from the outer side to the inner side in the direction of the axis x. Alternatively, as shown in FIG. 17, the foreign matter discharging groove 55 may extend in parallel with the axis x in the circumferential direction (provided that the foreign matter discharging groove 55 is viewed in the radial direction) or may extend obliquely with respect to the axis x in the circumferential direction. In the present embodiment, as shown in FIGS. 17 and 18, the foreign matter discharging groove 55 extends in parallel with the axis x in the circumferential direction and in parallel with the axis x in the radial direction. In short, the foreign matter discharging groove 55 extends in parallel with the axis x.

The outer side end part of the bottom part 55*a* of the foreign matter discharging groove 55 is connected to an opening part 36*s*in on the inner periphery side of the dust discharging hole 36*s*. However, the present disclosure is not limited to this, and the foreign matter discharging groove 55 may be formed at a position where the foreign matter discharging groove 55 is not connected to the opening part 36*s*in on the inner periphery side of the dust discharging hole 36*s*. In particular, in the case of the dust discharging groove 36*sa*, if the dust discharging groove 36*sa* is formed at the same position as the foreign matter discharging groove 55, the reason for existence of the foreign matter discharging groove 55 is lost, so that it is desirable that the dust discharging groove 36*sa* and the foreign matter discharging groove 55 are provided at different positions in the circumferential direction.

The foreign matter discharging groove 55 may extend over the entire outer circumferential surface 31 between the outer side and the inner side or may extend to a midpoint in the outer circumferential surface 31 from the inner end part (the inner end 31*a*) of the outer circumferential surface 31 toward the outer side. The contour of the foreign matter discharging groove 55 in the cross section perpendicular to the direction of extension thereof may have the same shape or a variable shape over the direction of extension. For example, the contour of the foreign matter discharging groove 55 in the cross section perpendicular to the direction of extension thereof may increase in width in the circumferential direction toward the inner side.

As described above, the foreign matter discharging groove 55, the dust discharging hole 36*s* or the dust discharging groove 36*sa* is formed in the outer circumferential surface 31 of the hub pocket 30, and foreign matter having entered the hub pocket 30 is likely to be discharged to the outside of the hub pocket 30 via the foreign matter discharging groove 55, the dust discharging hole 36*s* or the dust discharging groove 36*sa*. Therefore, deposition of foreign matter in the hub pocket 30, such as on the outer circumferential surface 31, can be efficiently reduced. In the case where the bottom part 55*a* of the foreign matter discharging groove 55 extends to deviate from the axis x as it goes from the outer side to the inner side in the direction of the axis x, foreign matter in the hub pocket 30 can be more easily discharged to the outside via the foreign matter discharging groove 55, the dust discharging hole 36*s* or the dust discharging groove 36*sa* under the centrifugal force produced by the rotation of the damper pulley 10 more than in the case where the bottom part 55*a* of the foreign matter discharging groove 55 extends at a uniform distance from the axis x. In the case where the foreign matter discharging groove 55 extends obliquely with respect to the axis x in the circumferential direction, foreign matter in the hub pocket 30 can be more easily discharged to the outside via the foreign matter discharging groove 55, the dust discharging hole 36*s* or the dust discharging groove 36*sa* due to a screw effect of the rotation of the damper pulley 10. In the case where the width in the circumferential direction of the contour of the foreign matter discharging groove 55 in the cross section perpendicular to the direction of extension thereof increases toward the inner side, foreign matter in the hub pocket 30 can be more easily discharged to the outside via the foreign matter discharging groove 55, the dust discharging hole 36*s* or the dust discharging groove 36*sa*.

As described above, in the sealing structure 6 with a torsional damper and an oil seal according to the sixth embodiment of the present disclosure, the labyrinth seal (the gap g1) formed by the side lip 29 and the hub pocket 30 can reduce entry of foreign matter having entered from the outside further to the seal lip 24 side. In addition, the foreign matter discharging groove 55, the dust discharging hole 36*s* or the dust discharging groove 36*sa* is formed in the outer circumferential surface 31 of the hub pocket 30, so that even if foreign matter passes through the gap g1 and enters the hub pocket 30, the foreign matter can be discharged to the outside via two discharge paths, the foreign matter discharging groove 55 and the dust discharging hole 36*s* or dust discharging groove 36*sa*, and deposition of foreign matter in the hub pocket 30 can be reduced. Thus, the sealing structure 6 can efficiently reduce entry of foreign matter further to the seal lip 24 side beyond the hub pocket 30.

As described above, the sealing structure 6 according to the sixth embodiment of the present disclosure can achieve the same effects and advantages as the sealing structures 1 to 4 according to the first to fourth embodiments, and the foreign matter can be more efficiently discharged through the foreign matter discharging groove 55, the dust discharging hole 36*s* or the dust discharging groove 36*sa*. Therefore, exposure of the seal lip 24 of the oil seal 20 to the foreign matter entering from the damper pulley 10 can be further reduced.

Seventh Embodiment

Next, a sealing structure with a torsional damper and an oil seal as a sealing structure with an annular pocket and a sealing apparatus according to a seventh embodiment of the present disclosure will be described. The sealing structure 7 with a torsional damper and an oil seal according to the seventh embodiment of the present disclosure differs from the sealing structure 6 with a torsional damper and an oil seal according to the sixth embodiment of the present disclosure described above only in the shape of an annular gap formed between the side lip 29 and the outer circumferential surface 31 of the hub pocket 30. In the following, only the difference will be described, and components of the sealing structure 7 with a torsional damper and an oil seal according to the seventh embodiment of the present disclosure that have the same functions as or similar functions to those of components of the sealing structure 6 according to the sixth embodiment of the present disclosure described above will be denoted by the same reference numerals and will not be further described.

Figure 19:
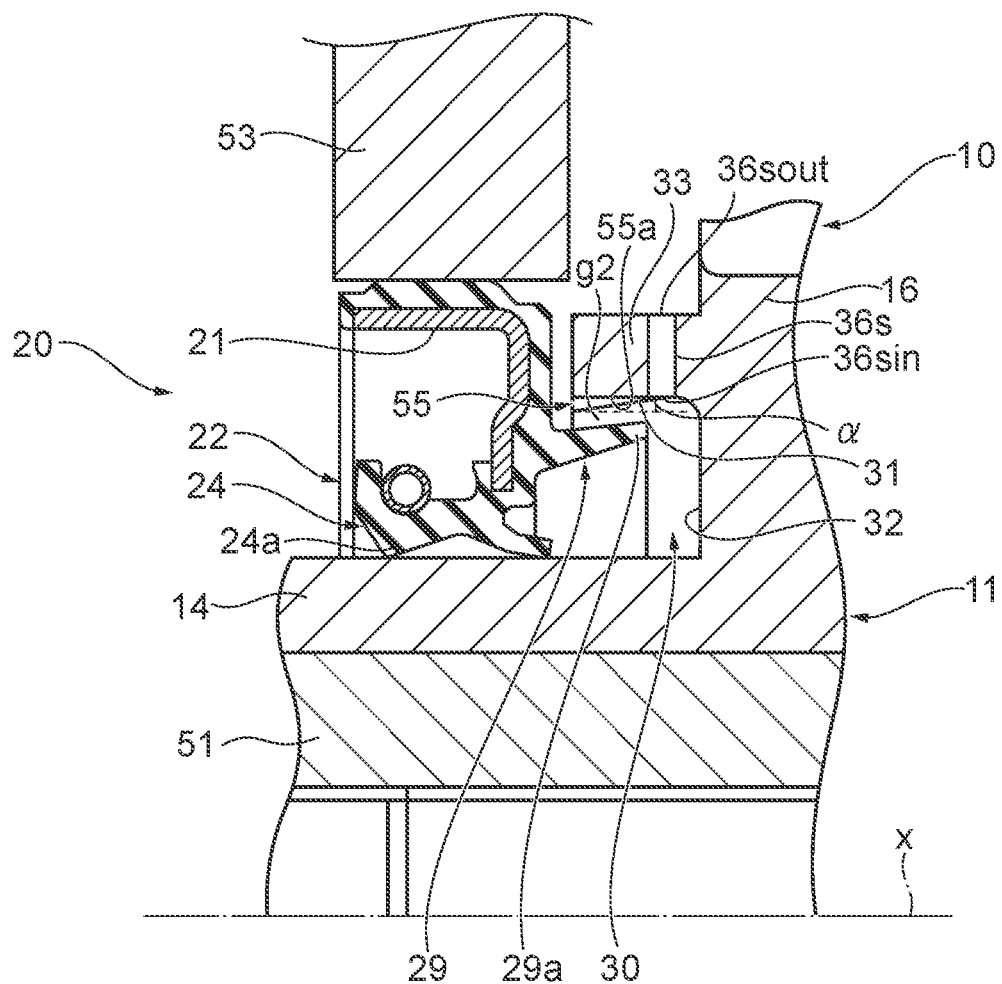
FIG. 19 is a partial enlarged cross-sectional view taken along the axis, showing a schematic configuration of a sealing structure with a torsional damper and an oil seal as a sealing structure with an annular pocket and a sealing apparatus according to a seventh embodiment of the present disclosure.

FIG. 19 is a partial enlarged cross-sectional view taken along the axis, showing a schematic configuration of the sealing structure 7 with a torsional damper and an oil seal according to the seventh embodiment of the present disclosure. As shown in FIG. 19, a part of the side lip 29 of the oil seal 20 on the outer end 29*a* side lies in the hub pocket 30, and the side lip 29 and the outer circumferential surface 31 of the hub pocket 30 overlap with each other in the radial direction and in the direction of the axis x. That is, the side lip 29 and the outer circumferential surface 31 of the hub pocket 30 are opposed to each other in the radial direction, and an annular gap g2 is formed between the side lip 29 and the outer circumferential surface 31 of the hub pocket 30. That is, the side lip 29 and the outer circumferential surface 31 of the hub pocket 30 overlap with each other.

The annular gap g2 formed between the side lip 29 and the outer circumferential surface 31 of the hub pocket 30 form a labyrinth seal. Therefore, as with the sealing structure 6, entry of foreign matter having entered from the damper pulley 10 further toward the seal lip 24 side can be reduced. Thus, exposure of the seal lip 24 of the oil seal 20 to the foreign matter entering from the damper pulley 10 can be reduced, damage to or deterioration of the lip tip end part 24a due to the lip tip end part 24a catching foreign matter can be reduced, and thus deterioration of the sealing performance of the oil seal 20 that leads to oil leakage can be reduced. In addition, since the foreign matter discharging groove 55, the dust discharging hole 36s or the dust discharging groove 36sa (not shown) is formed in the outer circumferential surface 31 of the hub pocket 30, so that even if foreign matter passes through the gap g2 and enters the hub pocket 30, the foreign matter can be discharged to the outside via the foreign matter discharging groove 55, the dust discharging hole 36s or dust discharging groove 36sa, and deposition of foreign matter in the hub pocket 30 can be reduced. Thus, the sealing structure 7 can efficiently reduce entry of foreign matter further to the seal lip 24 side beyond the hub pocket 30.

As described above, the sealing structure 7 with a torsional damper and an oil seal according to the seventh embodiment of the present disclosure can efficiently reduce exposure of the seal lip 24 of the oil seal 20 to foreign matter entering from the outside.

Eighth Embodiment

Next, a sealing structure with a torsional damper and an oil seal as a sealing structure with an annular pocket and a sealing apparatus according to an eighth embodiment of the present disclosure will be described. A sealing structure 8 with a torsional damper and an oil seal according to the eighth embodiment of the present disclosure differs from the sealing structure 6 with a torsional damper and an oil seal according to the sixth embodiment of the present disclosure described above in the structure forming the hub pocket 30. In the following, only the difference will be described, and components of the sealing structure 8 with a torsional damper and an oil seal according to the eighth embodiment of the present disclosure that have the same functions as or similar functions to those of the components of the sealing structure 6 according to the sixth embodiment of the present disclosure described above will be denoted by the same reference numerals and will not be further described.

Figure 20:
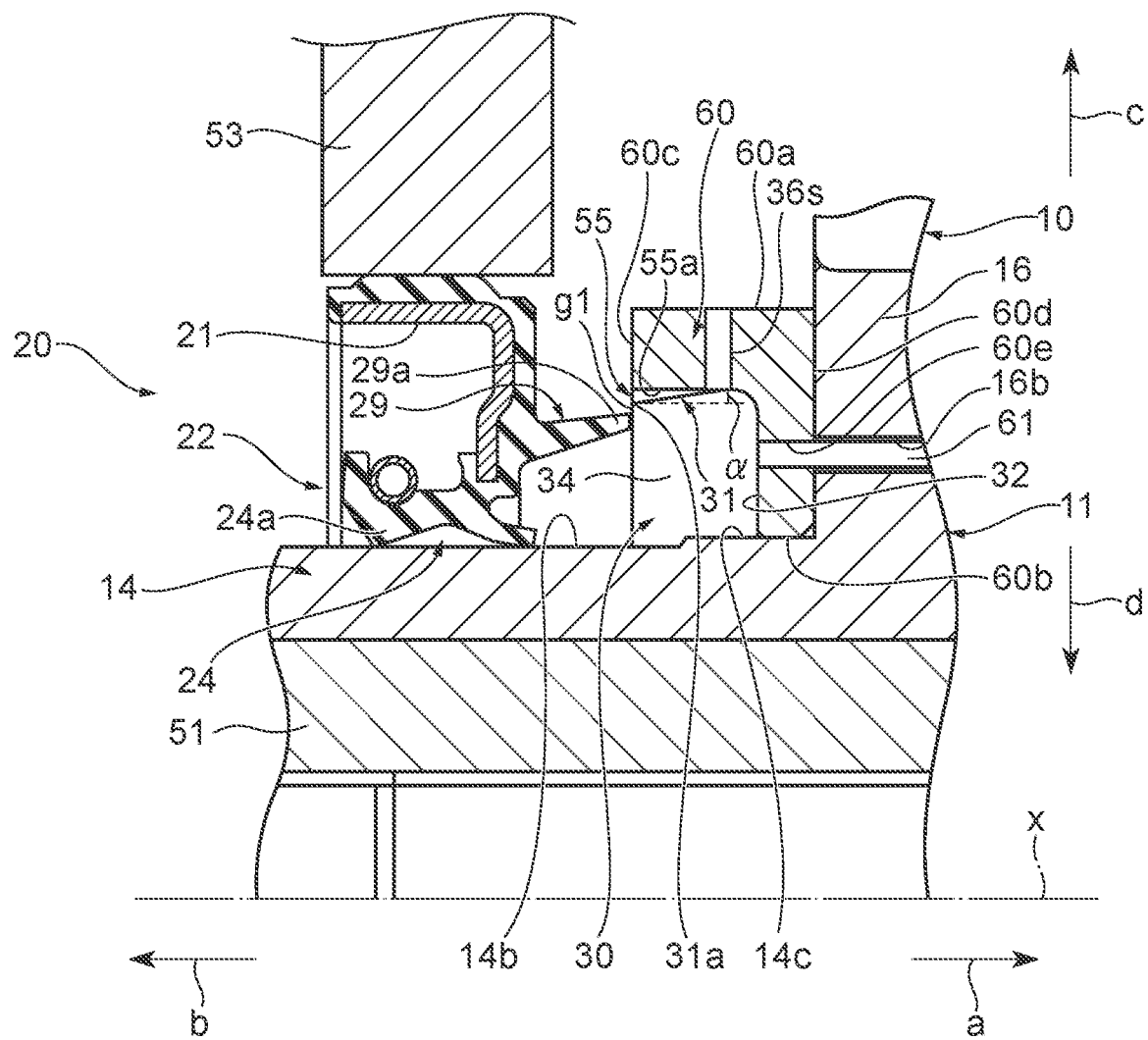
FIG. 20 is a partial enlarged cross-sectional view taken along an axis, showing a schematic configuration of a sealing structure with a torsional damper and an oil seal as a sealing structure with an annular pocket and a sealing apparatus according to an eighth embodiment of the present disclosure.
Figure 21:
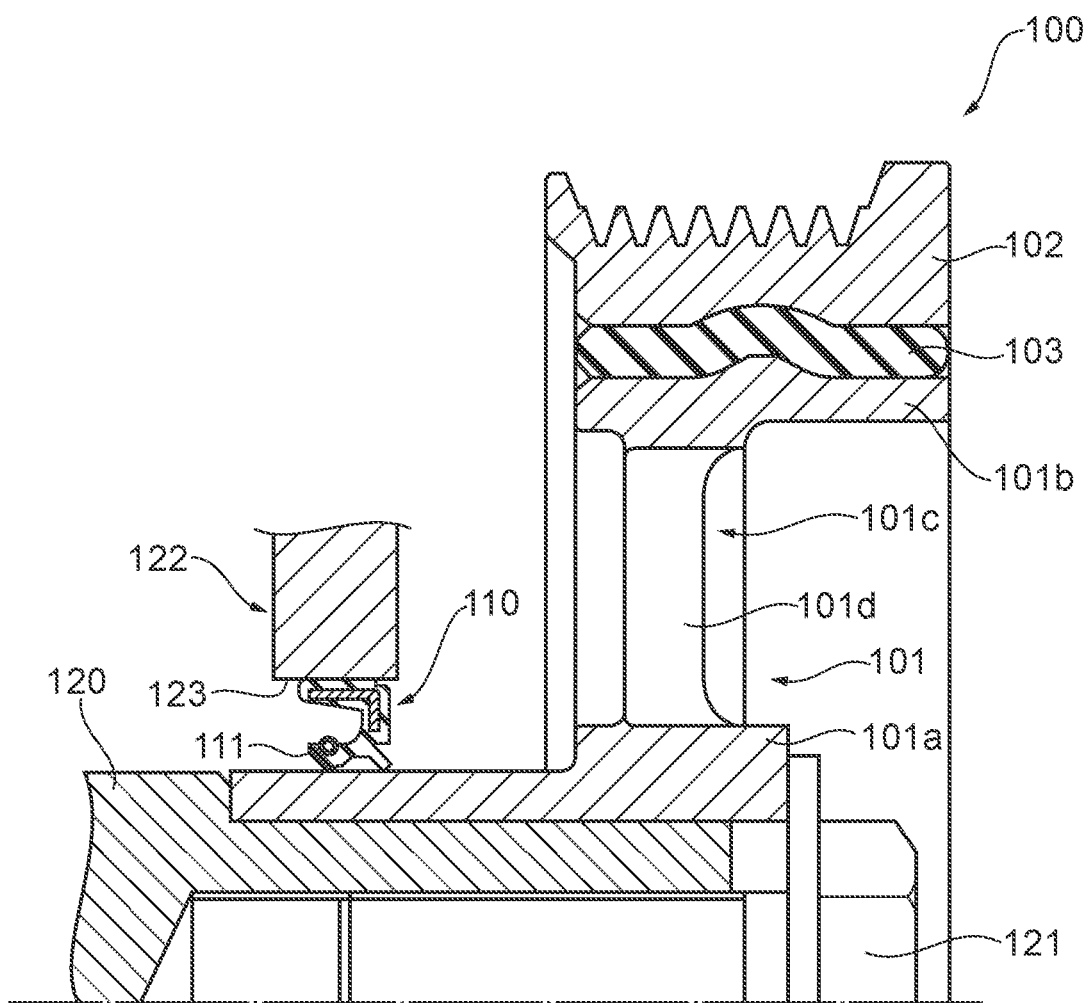
FIG. 21 is a partial cross-sectional view taken along an axis, schematically showing a conventional arrangement of a damper pulley and an oil seal used in an engine of a vehicle.

FIG. 20 is a partial enlarged cross-sectional view taken along the axis, showing a schematic configuration of the sealing structure 8 with a torsional damper and an oil seal according to the eighth embodiment of the present disclosure. As shown in FIG. 20, in the damper pulley 10 of the sealing structure 8 with a torsional damper and an oil seal, the outer circumferential surface 31 and the bottom surface 32 of the hub pocket 30 are not formed in the hub 11. The sealing structure 8 with a torsional damper and an oil seal has no projection 33 and has an attachment annular member 60 that is separate from the hub 11 and attached to the damper pulley 10, and the outer circumferential surface 31 and the bottom surface 32 of the hub pocket 30 are formed in the attachment annular member 60.

The attachment annular member 60 is a disk-shaped hollow annular member having an annular shape centered about the axis x. The attachment annular member 60 is shaped to be fitted around the boss part 14 of the damper pulley 10, and a recess is formed in one side surface of the attachment annular member 60 to provide the outer circumferential surface 31 and the bottom surface 32 of the hub pocket 30. More specifically, as shown in FIG. 20, the attachment annular member 60 has an outer periphery side surface 60a, which is a surface on the outer periphery side, and an inner periphery side surface 60b, which is a surface on the inner periphery side defining a through-hole in which the boss part 14 of the damper pulley 10 is inserted and fitted. A recess 34 that is recessed in the outer side direction is formed in a side surface 60c of the attachment annular member 60, which is a side surface thereof facing the inner side, to provide the outer circumferential surface 31 and the bottom surface 32 of the hub pocket 30.

The boss part 14 of the damper pulley 10 has a step surface 14c, which is an outer circumferential surface connected to the outer circumferential surface 14b on the outer side. The step surface 14c has a larger diameter than the outer circumferential surface 14b and protrudes beyond the outer circumferential surface 14b outward. The outer circumferential surface 14b and the step surface 14c are smoothly connected to each other. The attachment annular member 60 is attached to the boss part 14 with the inner periphery side surface 60b fitted into the step surface 14c of the boss part 14. Thus, in fitting of the attachment annular member 60, damage to the outer circumferential surface 14b, which is a lip sliding surface with which the lip tip end part 24a of the seal lip 24 comes into contact, can be prevented.

The attachment annular member 60 is attached to the damper pulley 10 by a fixing member 61 in such a manner that the attachment annular member 60 cannot relatively move with respect to the damper pulley 10. In the state in which the attachment annular member 60 is attached, a side surface 60d, which is a side surface of the attachment annular member 60 facing the outer side, is in contact with a side surface of the disk part 16. The fixing member 61 is a bolt, a rivet or a pin, for example, and fixes the attachment annular member 60 to the damper pulley 10 by being engaged with a through-hole 16b, which is a through-hole formed in the disk part 16 to extend in the direction of the axis x, and a through-hole 60e that is formed in the attachment annular member 60 to extend in the direction of the axis x penetrating between the bottom surface 32 and the side surface 60d. For example, one or both of the through-holes 16b and 60e is threaded, and the attachment annular member 60 is fixed to the damper pulley 10 by screwing a bolt serving as the fixing member 61 into the threaded hole. If the fixing member 61 is a pin or a rivet, the attachment annular member 60 is fixed to the damper pulley 10 by fitting the fixing member 61 into the through-hole 16b or 60e or engaging the fixing member 61 with the through-hole 16b or 60e. The method of fixing the attachment annular member 60 is not limited to the method described above, and any fixing member 61 that can achieve another known applicable fixing method can be used. Since the attachment annular member 60 is fixed to the damper pulley 10 with the fixing member 61, the attachment annular member 60 is firmly fixed to the damper pulley 10.

In the state in which the attachment annular member 60 is attached to the damper pulley 10, the annular gap g1 is formed between the outer end 29a of the side lip 29 of the oil seal 20 and the inner end 31a of the outer circumferential surface 31 of the hub pocket 30, and thus a labyrinth seal (the gap g1) is formed, as with the sealing structure 6 described above.

The material of the attachment annular member 60 may be a metal material or a resin material, for example, stainless steel or ABS resin. The resin material of the attachment annular member 60 is preferably a resin that can resist the ambient temperature of the use environment, such as an engine room.

As with the sealing structure 6 described above, the foreign matter discharging groove 55, the dust discharging hole 36s or the dust discharging groove 36sa (not shown) is formed in the outer circumferential surface 31 of the attachment annular member 60. One foreign matter discharging groove 55, one dust discharging hole 36s or one dust discharging groove 36sa may be formed in the outer circumferential surface 31, or a plurality of foreign matter discharging grooves 55, a plurality of dust discharging holes 36s or a plurality of dust discharging groove 36sa may be formed in the outer circumferential surface 31 at regular angular intervals in the circumferential direction.

The sealing structure 8 with a torsional damper and an oil seal according to the eighth embodiment of the present disclosure described above can achieve the same effects and advantages as the sealing structure 6 with a torsional damper and an oil seal according to the sixth embodiment of the present disclosure, and can efficiently reduce exposure of the seal lip 24 of the oil seal 20 to foreign matter entering from the outside.

With the sealing structure 8 with a torsional damper and an oil seal according to the eighth embodiment of the present disclosure, the outer circumferential surface 31 and the bottom surface 32 of the hub pocket 30 are formed in the attachment annular member 60, and therefore, the hub pocket 30 can be easily machined.

In the sealing structure 8 with a torsional damper and an oil seal according to the eighth embodiment of the present disclosure, the side lip 29 of the oil seal 20 is not in the hub pocket 30. However, as with the side lip 29 of the sealing structure 7 shown in FIG. 19, the part of the side lip 29 of the oil seal 20 on the outer end 29a side may lie in the hub pocket 30, and the side lip 29 and the outer circumferential surface 31 of the hub pocket 30 may overlap with each other in the radial direction and the direction of the axis x. That is, the side lip 29 and the outer circumferential surface 31 of the hub pocket 30 may be opposed to each other in the radial direction, and the annular gap (the gap g2) may be formed between the side lip 29 and the outer circumferential surface 31 of the hub pocket 30. In that case, for example, compared with the sealing structure 8 shown in FIG. 20, the outer circumferential surface 31 of the attachment annular member 60 extends further to the inner side, or the position of attachment of the attachment annular member 60 is displaced to the inner side.

Other Embodiments

Although embodiments of the present disclosure have been described above, the present disclosure is not limited to the embodiments described above and includes any aspects without departing from the spirit of the present disclosure and the scope of the claims. Furthermore, the configurations can be selectively combined as required in order to solve at least a part of the problems described above or achieve at least a part of the effects described above. For example, the shape, the material, the location, the size or the like of each component in embodiments described above can be changed as required depending on the specific application of the present disclosure.

For example, the sealing structure with an annular pocket and a sealing apparatus according to the present disclosure is not limited to the sealing structure with a torsional damper and an oil seal used between the torsional damper and the oil seal described above, but may be a sealing structure used between a shaft member or a rotating functional member as an attachment target and a sealing apparatus used therefor. For example, the sealing structure with an annular pocket and a sealing apparatus according to the present disclosure can be used for a rear end of an engine, a hub bearing for holding a wheel, or a differential unit, for example.

When the sealing structure with an annular pocket and a sealing apparatus according to the present disclosure is used for a rear end of an engine, the oil seal used to seal the gap between the case and the crankshaft at the rear end of the crankshaft serves as the sealing apparatus, and the flywheel serves as the functional member. The hub pocket 30 is formed by forming the outer circumferential surface 31 directly in the flywheel, or the hub pocket 30 with the outer circumferential surface 31 formed thereon is formed by an attachment annular member, such as a slinger, and the attachment annular member is attached to the flywheel to form the hub pocket 30 in the flywheel.

When the sealing structure with an annular pocket and a sealing apparatus according to the present disclosure is used for a hub bearing, the seal used to seal the gap between the outer ring and the inner ring serves as the sealing apparatus, and the inner ring serves as the shaft member. The hub pocket 30 is formed by forming the outer circumferential surface 31 directly in the hub ring inside the inner ring to which the wheel is attached, or the hub pocket 30 with the outer circumferential surface 31 formed thereon is formed by an attachment annular member, such as a slinger, and the attachment annular member is attached to the inner ring to form the hub pocket 30 in the inner ring.

When the sealing structure with an annular pocket and a sealing apparatus according to the present disclosure is used for a differential unit, the seal used to seal the gap between the housing and the output shaft serves as the sealing apparatus, and the output shaft serves as the shaft member. The hub pocket 30 is formed by forming the outer circumferential surface 31 directly in the output shaft, or the hub pocket 30 with the outer circumferential surface 31 formed thereon is formed by an attachment annular member, such as a slinger, and the attachment annular member is attached to the output shaft to form the hub pocket 30 in the output shaft.

Although the sealing structures with an annular pocket and a sealing apparatus according to the embodiments have been described as being used for an engine of an automobile, the application of the sealing structure with an annular pocket and a sealing apparatus according to the present disclosure is not limited thereto, and the present disclosure can be applied to any structure, such as a rotary shaft of another type of vehicle, a general-purpose machine, or an industrial machine, that can take advantage of the effects achieved by the present disclosure.

The shape of the attachment annular member 60 is not limited to the specific shapes described above. For example, the attachment annular member 60 may be fitted around the projection 33 of the damper pulley 10 of the sealing structure 6 so that the hub pocket 30 is formed in the damper pulley 10.

Although the torsional damper (damper pulley 10) according to these embodiments has been described as having the windows 16a that are through-holes penetrating the disk part 16 between the inner side and the outer side thereof, the application of the sealing structure with a torsional damper and an oil seal according to the present disclosure is not limited thereto, and the present disclosure can be applied to a torsional damper having no windows 16a.

Although the sealing structures 1, 2, 3, 4, 5, 6, 7 and 8 with the damper pulley 10 and the oil seal 20 according to the first to eighth embodiments have been described as being used for an engine of an automobile, the application of the sealing structures 1, 2, 3, 4, 5, 6, 7 and 8 according to the present disclosure is not limited thereto, and the present disclosure can be applied to any structure, such as a rotary shaft of another type of vehicle, a general-purpose machine, or an industrial machine, that can take advantage of the effects achieved by the present disclosure.

LIST OF REFERENCE SIGNS 1, 2, 3, 4, 5, 6, 7, 8 sealing structure with a torsional damper and an oil seal
10, 100 damper pulley
11, 101 hub
12, 102 pulley
12a inner circumferential surface
12b outer circumferential surface
12c v-shaped groove
13, 103 damper elastic body
14, 101a boss part
14a through-hole
14b outer circumferential surface
14c step surface
15, 101b rim part
15a inner circumferential surface
15b outer circumferential surface
16, 101c disk part
16a, 101d window
16b through-hole
20, 110 oil seal
21 reinforcing ring
21a disk part
21b cylindrical part
22 elastic body part
23 lip waist part
24, 111 seal lip
24a lip tip end part
25 dust lip
26 garter spring
27 rear cover
28 gasket part
29 side lip
29a outer end
30 hub pocket
31 outer circumferential surface
31a inner end
32 bottom surface
33 projection (outer shell part)
34 recess
35 outer periphery side surface
35a bottom part
36, 36a, 37, 40, 41 dust discharging hole
36sa dust discharging groove
51, 120 crankshaft
52, 121 bolt
53, 122 front cover
54, 123 through-hole
54a inner circumferential surface
55 foreign matter discharging groove
60 attachment annular member
60a outer periphery side surface
60b inner periphery side surface
60c, 60d side surface
60e through-hole
61 fixing member
g1, g2 gap (labyrinth seal)
x axis

The invention claimed is:

1. A sealing structure with an annular pocket and a sealing apparatus,
wherein the pocket has an outer circumferential surface extending along an axis and forms an annular shape around the axis, forms a recess in an annular shape centered about the axis that is recessed toward one side in a direction of the axis, and is formed in a shaft member that is capable of rotating about the axis and penetrates through a through-hole in an attachment target to which the sealing apparatus is to be attached or in a functional member attached to the shaft member,
the sealing apparatus includes a seal lip in an annular shape centered about the axis and a side lip in an annular shape centered about the axis that extends toward the one side in the direction of the axis, and is attached in the through-hole in the attachment target to form a seal between the shaft member or the functional member and the through-hole,
in the sealing apparatus attached to the attachment target, the seal lip is in direct or indirect contact with the shaft member or the functional member in a slidable manner, and the side lip extends toward the pocket and forms an annular gap between the side lip and the outer circumferential surface of the pocket,
the pocket is formed in an outer shell part that is opposed to the shaft member or the functional member on an outer periphery side,
a dust discharging hole or a dust discharging groove connected to the pocket is formed in the outer shell part, and
the dust discharging hole or the dust discharging groove is inclined at a predetermined angle in such a manner that a discharge opening is directed in an opposite direction to a rotational direction of the shaft member or the functional member.

2. The sealing structure with an annular pocket and a sealing apparatus according to claim 1, wherein the dust discharging hole is formed at a location in the vicinity of a bottom surface of the pocket, which is an outer side surface forming the recess.

3. The sealing structure with an annular pocket and a sealing apparatus according to claim 1, wherein the side lip forms the annular gap between the side lip and an end part of the outer circumferential surface of the pocket on an oil seal side.

4. The sealing structure with an annular pocket and a sealing apparatus according to claim 1, wherein the side lip is opposed to the outer circumferential surface of the pocket and forms the annular gap between the side lip and the outer circumferential surface of the pocket.

5. The sealing structure with an annular pocket and a sealing apparatus according to claim 1, wherein an outer periphery side surface of the pocket, which is a surface of the outer shell part on the outer periphery side, decreases in diameter toward the one side in the direction of the axis.

6. The sealing structure with an annular pocket and a sealing apparatus according to claim 1, wherein the outer circumferential surface of the pocket increases in diameter toward the one side in the direction of the axis and has at least one foreign matter discharging groove, which is a groove that is recessed in a direction to the outer periphery side and extends from the one side to another side in the direction of the axis.

7. The sealing structure with an annular pocket and a sealing apparatus according to claim 6, wherein the foreign matter discharging groove has a bottom part, which is a part on the outer periphery side, extending along the axis in a radial direction.

8. The sealing structure with an annular pocket and a sealing apparatus according to claim 7, wherein the foreign matter discharging groove extends in the radial direction in such a manner that the bottom part deviates from the axis as the foreign matter discharging groove extends from the one side toward the other side in the direction of the axis.

\* \* \* \* \*

UNITED STATES PATENT AND TRADEMARK OFFICE
CERTIFICATE OF CORRECTION

| | |
|---|---|
| PATENT NO. | : 10,663,031 B2 |
| APPLICATION NO. | : 15/995308 |
| DATED | : May 26, 2020 |
| INVENTOR(S) | : Akihiro Komyo et al. |

It is certified that error appears in the above-identified patent and that said Letters Patent is hereby corrected as shown below:

On the Title Page

Item (30): Foreign Application Priority Data please add:
-- Dec. 4, 2015 (JP)................................2015-237231 --
-- Jun. 1, 2016 (JP)................................2016-109943 --

Signed and Sealed this
Eighteenth Day of August, 2020

Andrei Iancu
*Director of the United States Patent and Trademark Office*